(12) United States Patent
Shiraki

(10) Patent No.: US 7,734,408 B2
(45) Date of Patent: *Jun. 8, 2010

(54) ELECTRIC PARKING BRAKE SYSTEM AND METHOD FOR CONTROLLING THE ELECTRIC PARKING BRAKE SYSTEM

(75) Inventor: Takahiro Shiraki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 182 days.

This patent is subject to a terminal disclaimer.

(21) Appl. No.: 11/855,550

(22) Filed: Sep. 14, 2007

(65) Prior Publication Data

US 2008/0071454 A1 Mar. 20, 2008

(30) Foreign Application Priority Data

Sep. 15, 2006 (JP) .............................. 2006-251805

(51) Int. Cl.
*B60T 8/24* (2006.01)

(52) U.S. Cl. .............................. 701/80; 701/70; 701/78; 303/191; 303/192; 188/2 D; 188/156

(58) Field of Classification Search ................... 188/68, 188/72.2, 325, 326, 327, 328, 329, 330, 331, 188/332, 333, 334, 342, 156, 158, 159, 160, 188/162; 701/70, 78, 80, 83; 192/219.1, 192/219.2, 219.4; 303/191, 192

See application file for complete search history.

(56) References Cited

FOREIGN PATENT DOCUMENTS

| DE | 196 53 961 A1 | | 6/1998 |
|---|---|---|---|
| DE | 603 01 690 T2 | | 6/2006 |
| JP | 2002096721 A | * | 4/2002 |
| JP | 2003-327099 | | 11/2003 |
| JP | 2006-111208 A | | 4/2006 |
| JP | 2006-131151 A | | 5/2006 |
| JP | 2006131151 A | * | 5/2006 |

OTHER PUBLICATIONS

Yamamoto, Translation of JP 2002-096721, Brake Device for Vehicle, Apr. 2, 2002, JPO.*
Shiraki et al, Translation of JP 2006-131151, Electric Parking Brake Device, May 25, 2006, JPO.*

* cited by examiner

*Primary Examiner*—Khoi Tran
*Assistant Examiner*—Spencer Patton
(74) *Attorney, Agent, or Firm*—Oblon, Spivak, McClelland, Maier & Neustadt, L.L.P.

(57) ABSTRACT

In an electric parking brake system including a tension control unit that controls the friction member pushing force in a brake by controlling the tension of a cable, the target tension is set to a larger value when a vehicle is maintained at a standstill on a downhill slope than when the vehicle is maintained at a standstill on an uphill slope.

1 Claim, 23 Drawing Sheets

ΔHsc > ΔHs0

|γ down| > γ up

ELECTRIC PARKING BRAKE SYSTEM AND METHOD FOR CONTROLLING THE ELECTRIC PARKING BRAKE SYSTEM

INCORPORATION BY REFERENCE

The disclosure of Japanese Patent Application No. 2006-251805 filed on Sep. 15, 2006 including the specification, drawings and abstract is incorporated herein by reference in its entirety.

BACKGROUND OF THE INVENTION

1. Field of the Invention

The invention relates generally to an electric parking brake system and a method for controlling the electric parking brake system, and, more specifically, to a control over a force with which a pushing mechanism pushes a friction member against a friction face in the electric parking brake system.

2. Description of the Related Art

Japanese Patent Application Publication No. JP-2003-327099 (JP-A-2003-327099) describes a technology related to an electric parking brake system. According to the technology, when a parking brake is applied while a vehicle is standstill on a slope, the target value of the tension of a cable is set to a larger value when the absolute value of the inclination angle of the vehicle is large than when the absolute value of the inclination angle of the vehicle is small. In addition, when the vehicle is standstill on a downhill slope and the shift position is in Drive, the target value of the tension of the cable is set to a value larger than the target value that is determined based on the absolute value of the inclination angle of the vehicle. When the vehicle is standstill on an uphill slope and the shift position is in Reverse, the target value of the tension of the cable is set to a value larger than the target value that is determined based on the absolute value of the inclination angle of the vehicle.

SUMMARY OF THE INVENTION

The invention makes it possible to control a friction member pushing force to a value, at which a vehicle is appropriately maintained at a standstill, in consideration of the characteristics of a drum brake, in an electric parking brake system and a method for controlling the electric parking brake system.

A first aspect of the invention relates to an electric parking brake system, including a drum brake that includes a drum which rotates together with a wheel of a vehicle and of which the inner peripheral face is used as a friction face, a shoe which is fitted to a backing plate that is a non-rotating body so as to be movable relative to the backing plate, and which has a friction member on the outer peripheral face, and a pushing mechanism that pushes the shoe against the friction face to suppress the rotation of the drum; an electric motor; a motion conversion mechanism that converts the rotation of a rotating shaft of the electric motor into the linear motion of an output member of the motion conversion mechanism; a cable that is connected at one end to the output member of the motion conversion mechanism, and that is connected at the other end to the pushing mechanism; a maintaining mechanism that maintains the friction member pushing force that is the force with which the friction member is pushed against the friction face in the drum brake, when electric current is not supplied to the electric motor; and a tension control unit that controls the tension of the cable by controlling the electric motor such that the friction member pushing force in the drum brake is controlled. In the electric parking brake system, the tension control unit includes an inclination-based tension control unit that makes the tension of the cable different depending on whether the vehicle is maintained at a standstill on an uphill slope or a downhill slope, even when the absolute value of the inclination angle of the uphill slope and the absolute value of the inclination angle of the downhill slope are equal to each other and a drive power is not applied to the vehicle. In the electric parking brake mechanism, when the electric motor is operated, the rotation of the rotating shaft of the electric motor is converted into the linear motion of the output member, whereby the cable is pulled. In the drum brake, the friction member is pushed against the friction face by the pushing mechanism. As a result, the drum brake is applied. The friction member pushing force in the drum brake is controlled by controlling the tension of the cable. The friction member pushing force is maintained by the maintaining mechanism even if electric current is not supplied to the electric motor. In the electric parking brake system, the tension of the cable is controlled to a value at which the vehicle is maintained at a standstill based on the moving force applied to the vehicle. Meanwhile, due to the characteristics of the drum brake, the braking torque that can be obtained differs depending on whether a torque is applied to the wheel in the direction in which the vehicle moves forward or in the direction in which the vehicle backs up, even if the tension of the cable is the same. Also, a torque is applied to the wheel in the direction in which the wheel is rotated to move the vehicle forward on a downhill slope, and a torque is applied to the wheel in the direction in which the wheel is rotated to backs up the vehicle on an uphill slope. Accordingly, in consideration of the characteristics of the drum brake, the tension of the cable is made different depending on whether the vehicle is maintained at a standstill on an uphill slope or a downhill slope, even if a drive power is not applied to the vehicle and the absolute value of the inclination angle of the uphill slope and the absolute value of the inclination angle of the downhill slope are equal to each other. For example, in order to obtain the same degree of the braking torque, the target value of the tension of the cable is made different depending on whether the vehicle is maintained at a standstill on a downhill slope or an uphill slope. As a result, it is possible to control the tension of the cable to a value at which the vehicle is appropriately maintained at a standstill regardless of whether the vehicle is on an uphill slope or a downhill slope.

A second aspect of the invention relates to the electric parking brake system according to the first aspect of the invention. According to the second aspect of the invention, the inclination-based tension control unit includes an inclination-based target value setting unit that sets the target value of the tension to a larger value when the vehicle is maintained at a standstill on a downhill slope than when the vehicle is maintained at a standstill on an uphill slope. Due to the characteristics of the drum brake, even if the tension of the cable is controlled to be the same, the braking torque actually obtained is lower when a torque is applied to the wheel in the direction in which the vehicle moves forward than when a torque is applied to the wheel in the direction in which the vehicle backs up. Accordingly, the target value of the tension of the cable is set to a larger value when the vehicle is maintained at a standstill on a downhill slope than when the vehicle is maintained at a standstill on an uphill slope.

A third aspect of the invention relates to a method for controlling the electric parking brake system including a drum brake that includes a drum which rotates together with a wheel of a vehicle and of which the inner peripheral face is used as a friction face, a shoe which is fitted to a backing plate that is a non-rotating body so as to be movable relative to the backing plate, and which has a friction member on the outer peripheral face, and a pushing mechanism that pushes the shoe against the friction face to suppress the rotation of the drum; an electric motor; a motion conversion mechanism that converts the rotation of a rotating shaft of the electric motor into the linear motion of an output member of the motion conversion mechanism; a cable that is connected at one end to the output member of the motion conversion mechanism, and that is connected at the other end to the pushing mechanism; a maintaining mechanism that maintains the friction member pushing force that is the force with which the friction member is pushed against the friction face in the drum brake, when electric current is not supplied to the electric motor, and a tension control unit that controls the tension of the cable by controlling the electric motor such that the friction member pushing force in the drum brake is controlled. According to the method, the tension of the cable is made different depending on whether the vehicle is maintained at a standstill on an uphill slope or a downhill slope, even when the absolute value of the inclination angle of the uphill slope and the absolute value of the inclination angle of the downhill slope are equal to each other and a drive power is not applied to the vehicle.

BRIEF DESCRIPTION OF THE DRAWINGS

The foregoing and further features and advantages of the invention will become apparent from the following description of an example embodiment with reference to the accompanying drawings, wherein the same or corresponding portions will be denoted by the same reference numerals and wherein.

DETAILED DESCRIPTION OF THE EMBODIMENT

Figure 1:
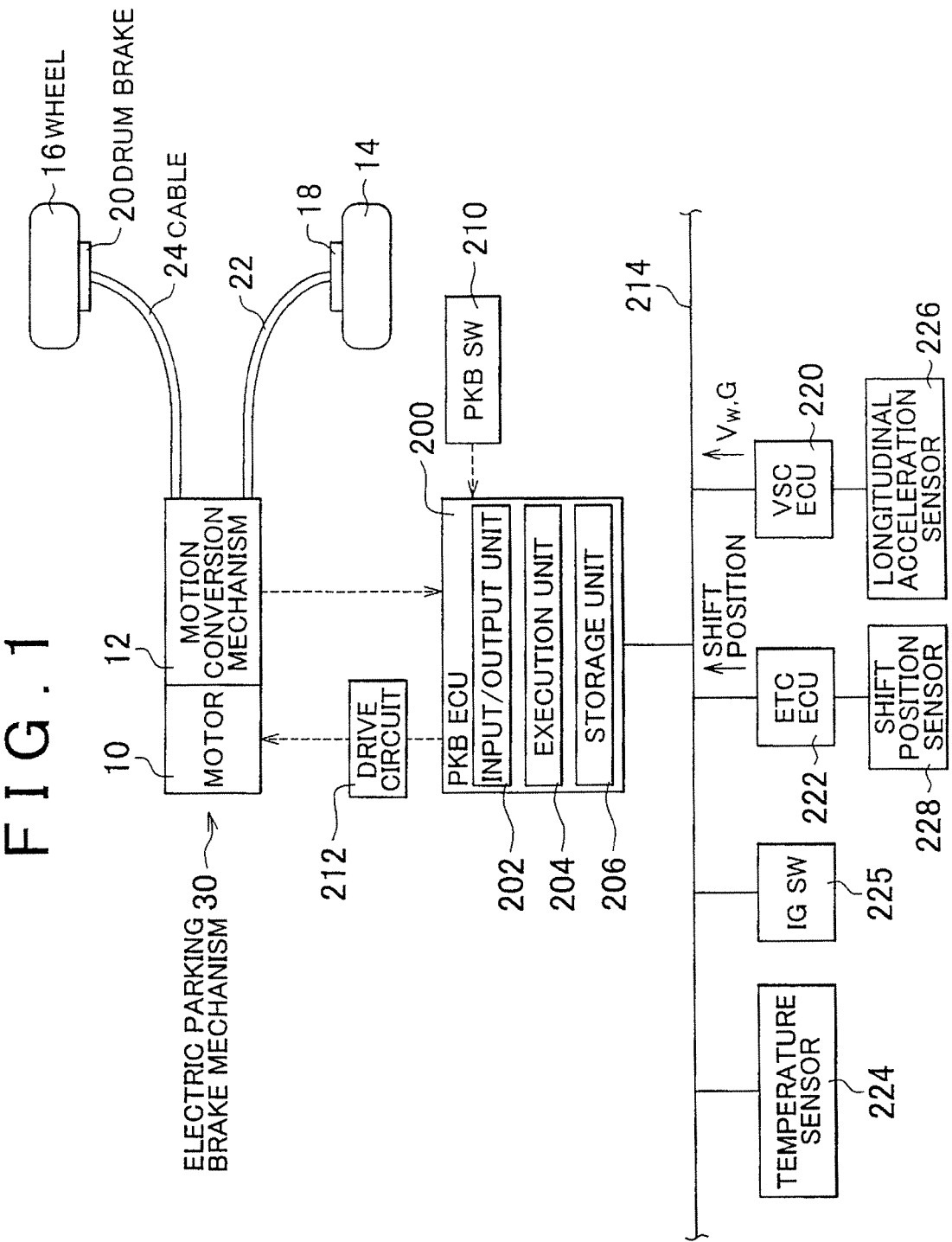
FIG. 1 is an overall view showing an electric parking brake system according to an embodiment of the invention.

An electric parking brake system according to an embodiment of the invention will be described in detail with reference to the accompanying drawings. FIG. 1 shows an electric motor 10 and a motion conversion mechanism 12 with a clutch. The motion conversion mechanism 12 with a clutch converts the rotation of an output shaft 52 of the electric motor 10 into the liner motion of an output member, and prevents the electric motor 10 from being rotated due to a force applied to the output member. FIG. 1 also shows wheels 14 and 16, and parking brakes 18 and 20 that are provided to the wheels 14 and 16, respectively. The parking brakes 18 and 20 are connected to the motion conversion mechanism 12 via cables 22 and 24, respectively. When the cables 22 and 24 are pulled due to the operation of the electric motor 10, the parking brakes 18 and 20 are applied. According to the embodiment of the invention, the electric motor 10, the motion conversion mechanism 12 with a clutch, the cables 22 and 24, the parking brakes 18 and 20, etc. constitute an electric parking brake mechanism 30.

Figure 2:
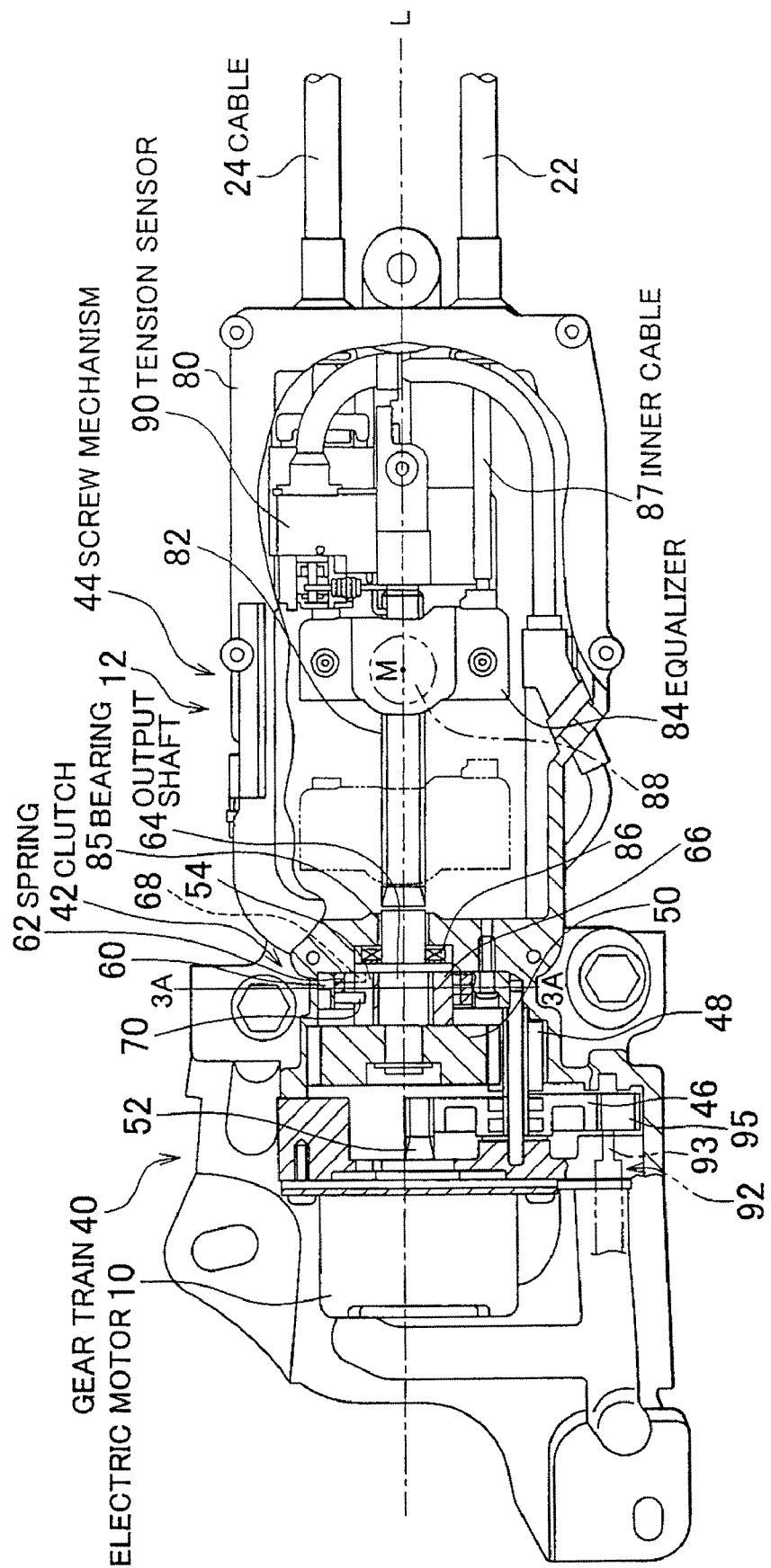
FIG. 2 is a cross-sectional view showing an electric motor and a motion conversion mechanism included in the electric parking brake system.
Figure 3:
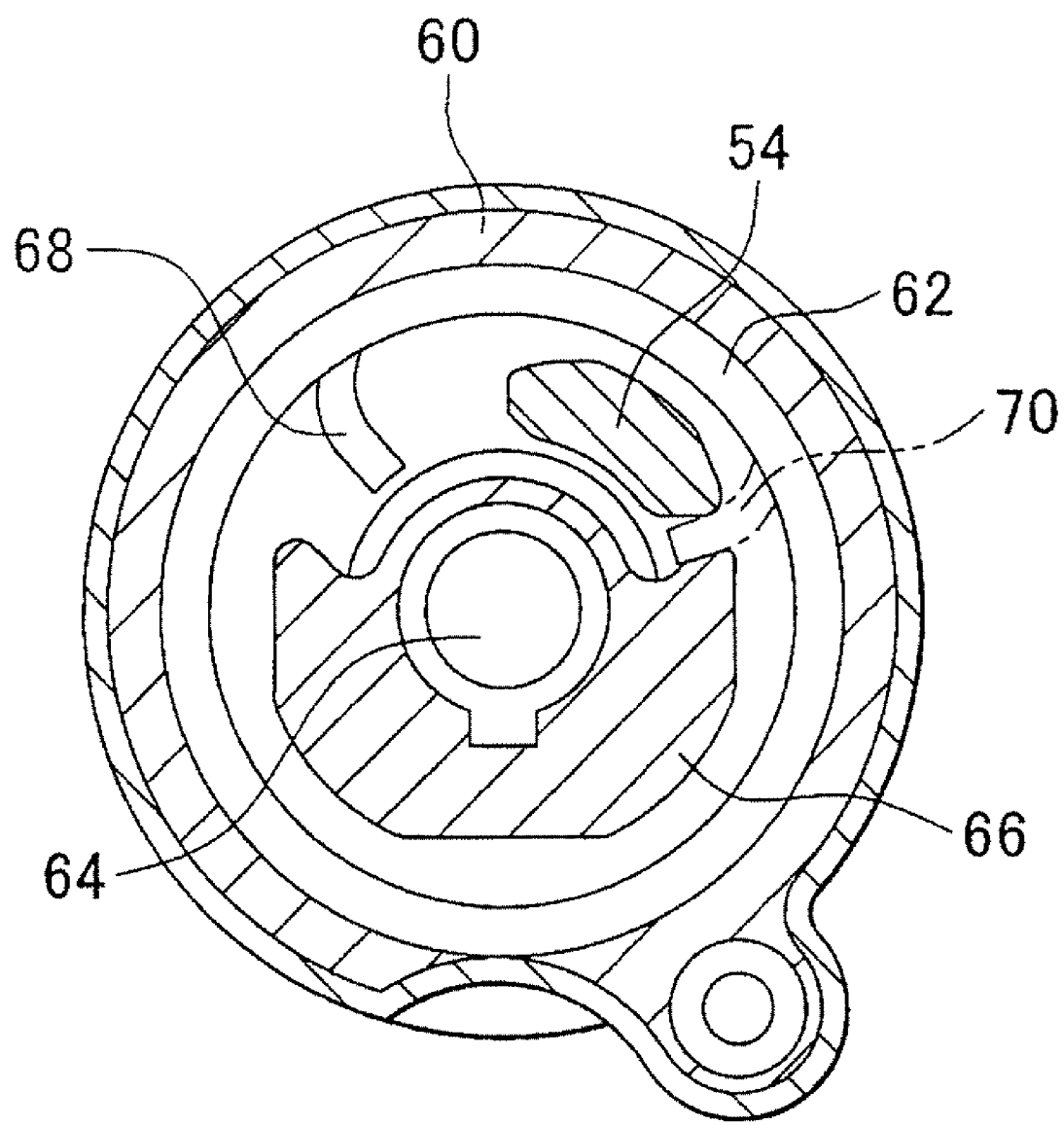
FIG. 3 is a cross-sectional view showing the motion conversion mechanism, taken along the line 3A-3A in FIG. 2 (a cross-sectional view of a clutch)

The motion conversion mechanism 12 with a clutch includes a gear train 40, a clutch 42, a screw mechanism 44, etc, as shown in FIG. 2. The gear train 40 is formed of multiple gears 46, 48 and 50. The gear 46 is meshed with the output shaft 52 of the electric motor 10, whereby the rotation of the gear 46 is transferred to the gear 50 via the gear 48. A drive power transfer unit 54 extends, in the axial direction, from the end face of the gear 50, the end face being opposite to the electric motor 10. The clutch 42 is a one-way clutch. As shown in FIG. 3, the clutch 42 includes a housing 60, a coil spring 62 that is provided on the inner peripheral side of the housing 60, and a rotor 66 that rotates together with an output shaft 64 of the clutch 42. The coil spring 62 is closely fitted to the housing 60 with its coil diameter elastically and slightly reduced. The outer peripheral face of the coil spring 62 closely contacts the inner peripheral face of the housing 60, and ends 68 and 70 of the wire, which forms the coil spring 62, projects inwardly. The drive power transfer unit 54 of the gear 50 is positioned in one of the two spaces defined by the two ends 68 and 70, and the rotor 66 is positioned in the other of these two spaces.

When the gear 50 rotates in accordance with the rotation of the electric motor 10, the drive power transfer unit 54 contacts one of the ends 68 and 70, and the coil spring 62 is wound up, which reduces the frictional force between the inner peripheral face of the housing 60 and the outer peripheral face of the coil spring 62. This allows the coil spring 62 and the rotor 66 to rotate. As a result, the output shaft 64 rotates. Because the output shaft 64 rotates together with the gear 50, the rotation of the electric motor 10 is transferred to the output shaft 64 via the clutch 42. If a torque is applied to the output shaft 64 when electric currents are not supplied to the electric motor 10, the rotor 66 contacts one of the ends 68 and 70. This increases the coil diameter of the spring coil 62. Then, the frictional force between the outer peripheral face of the coil spring 62 and the inner peripheral face of the housing 60 increases, and therefore the rotation of the coil spring 62 is interrupted. Transfer of the torque from the output shaft 64 to the gear 50 is interrupted by the clutch 42. When electric currents are not supplied to the electric motor 10, the rotation of the electric motor 10 due to the torque applied to the output shaft 64 is not caused.

The screw mechanism 44 includes a housing 80, a male screw member 82 that extends in parallel with the axis L, a nut (not shown) that is fitted to the male screw member 82, and an equalizer 84 that is fitted to the nut so as to be able to relatively rotate about the axis M. The male screw member 82 is supported, via a pair of radial bearings 85 (one of the radial bearings 85 is not shown FIG. 2) and a needle thrust bearing 86, by the housing 80 so as to be able to rotate relative to the housing 80. An inner cable 87 of the cable 22 and an inner cable 87 of the cable 24 are connected to respective arms of the equalizer 84. A fitting projection 88 is formed on a body of the equalizer 84. Although not shown in the FIG. 2, the equalizer 84 is fitted in a guide that is formed in the housing 80 and that extends in parallel with the axis L. With this structure, the equalizer 84 is not rotatable about the axis L relative to the housing 80, movable in the direction parallel to the axis L relative to the housing 80, and pivotal about the fitting projection 88 (about the axis M).

The equalizer 84 is movable relative to the housing 80, within the range between the position indicated by the solid lines and the position indicated by the dashed-two dotted lines shown in FIG. 2. As the equalizer 84 moves relative to the housing 80, the inner cables 87 of the cables 22 and 24 are pulled or slackened. The equalizer 84 pivots about the fitting projection 88 (about the axis M) such that the tension applied to the inner cable 87 of the cable 22 and the tension applied to the inner cable 87 of the cable 24 (hereinafter, simply referred to as the tension of the cable 22 and the tension of the cable 24) are equal to each other. A tension sensor 90 that detects the tension of the cable 24 is provided in the housing 80. Because the tension of the cable 22 and the tension of the cable 24 are equalized by the equalizer 84, the tension of the cable 24, which is detected by the tension sensor 90, is equal to the tension of the cable 22. A malfunction-time release device 92 is shown in FIG. 2. The malfunction-time release device 92 releases the parking brakes 18 and 20, for example, when the electric motor 10 malfunctions. A cable 93 is pushed into a gear 95 and a grip portion (not shown) is then manually rotated, whereby the gear 95 is rotated. The rotation of the gear 95 is transferred to the gear 50 via the gears 46 and 48, and the rotation of the gear 50 moves the equalizer 84 such that the cables 22 and 24 are slackened. As a result, the parking brakes 18 and 20 are released.

Figure 4:
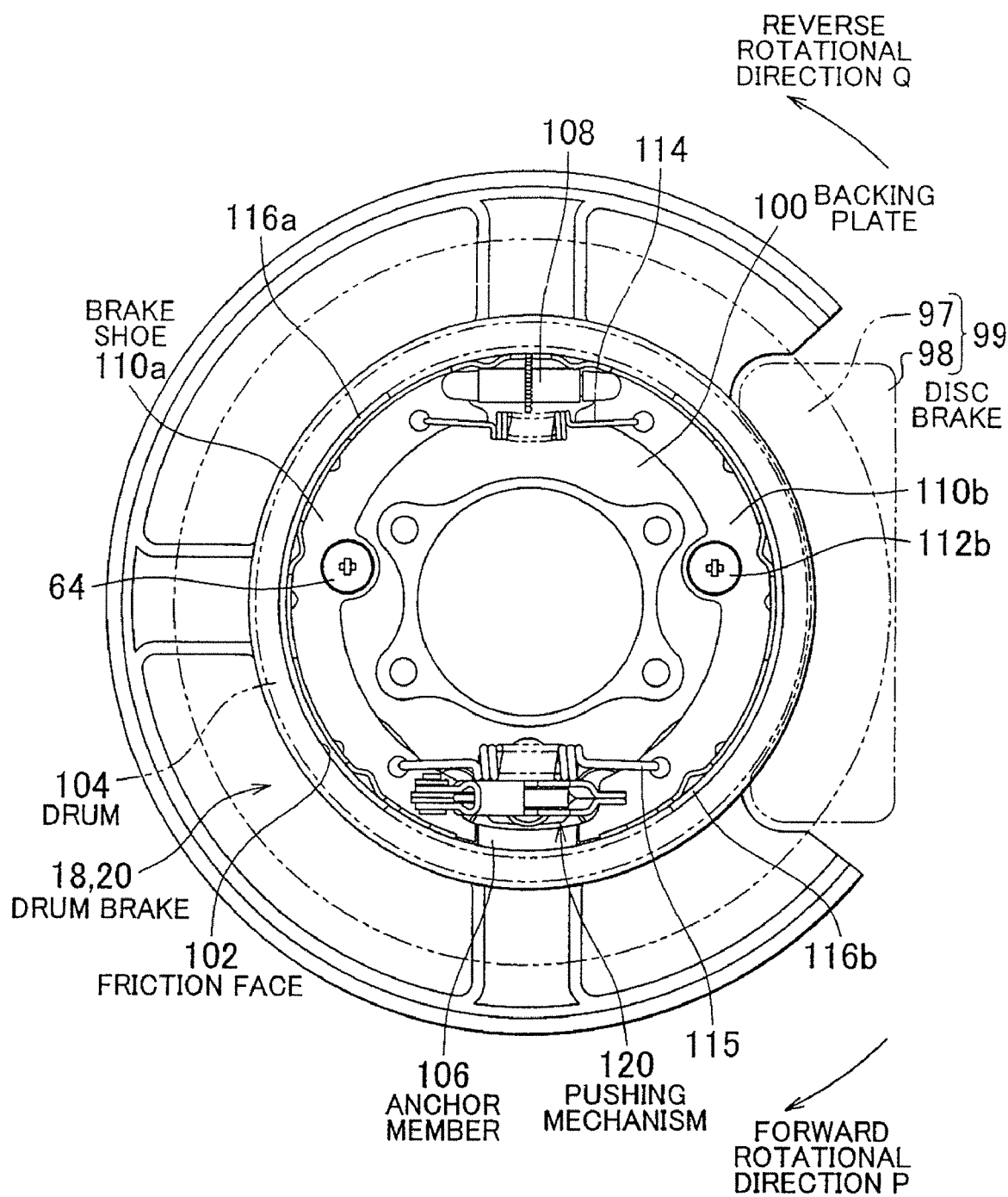
FIG. 4 is a front view showing a drum brake included in the electric parking brake system.
Figure 5:
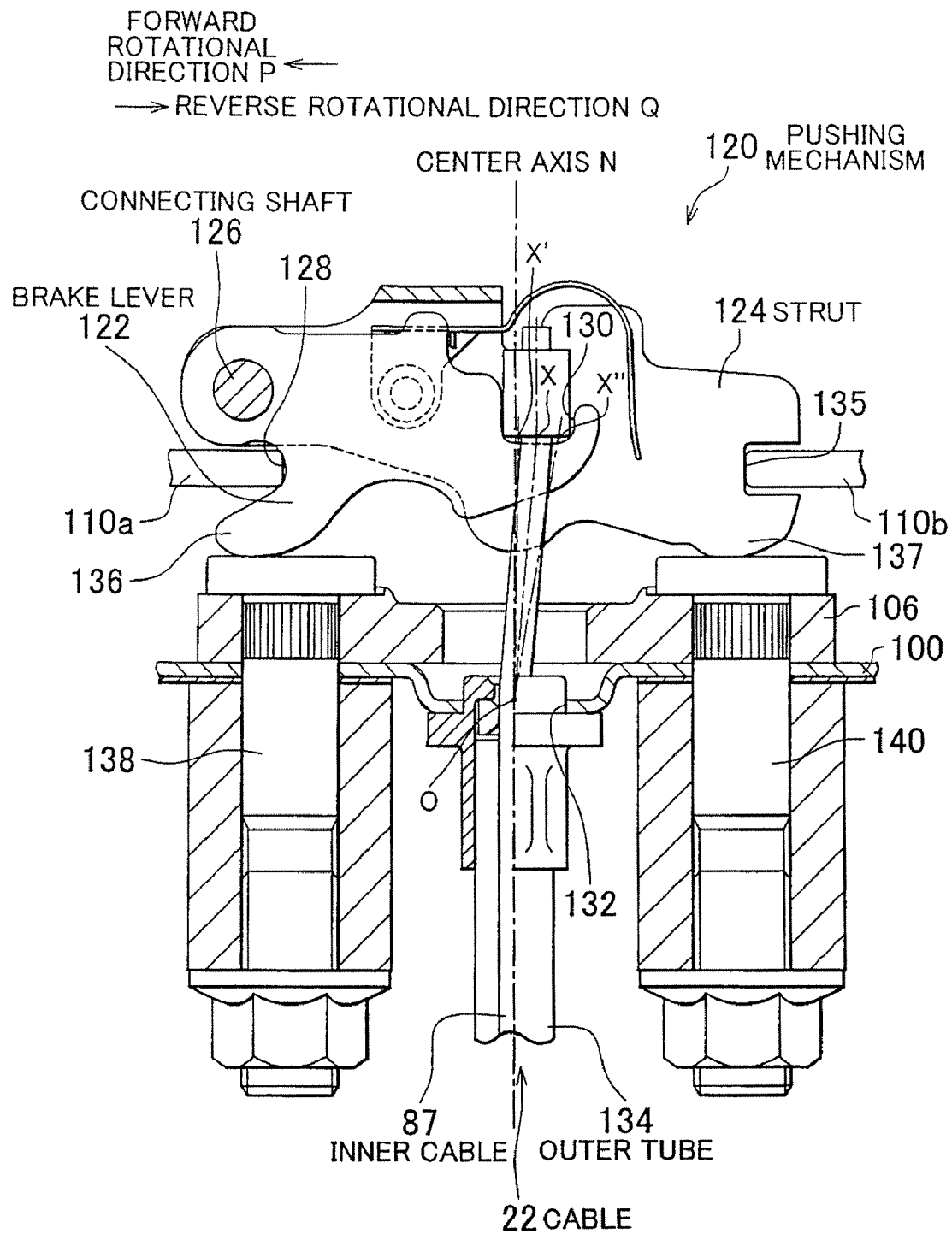
FIG. 5 is a front view showing a pushing mechanism of the drum brake.

As shown in FIGS. 4 and 5, the parking brakes 18 and 20 are duo-servo drum brakes, in the embodiment of the invention. Accordingly, the parking brakes 18 and 20 will be sometimes referred to as the drum brakes if necessary. In FIG. 4, a brake disc 97 and a caliper 98 are shown. The brake disc 97 and the caliper 98 constitute a disc brake 99 which serves as a service brake. Each of the drum brakes used as the parking brakes 18 and 20 is provided on the inner peripheral side of the brake disc 97. In the embodiment of the invention, the parking brakes 18 and 20 are drum-in disc-brakes. Because the drum brakes 18 and 20 have the same structure, the drum brake 18 will be described below, and the description concerning the drum brake 20 is omitted.

The drum brake 18 includes a backing plate 100 that is a non-rotating member fitted to a vehicle body (not shown), and a drum 104 of which the inner peripheral face is used as a friction face 102 and which rotates together with the wheel 14. An anchor member 106 and an adjuster 108, which serves as a relay link, are provided on the backing plate 100, at positions that are apart from each other along one diameter of the backing plate 100. The anchor member 106 is fixed to the backing plate 100, and the adjuster 108 is a floating member. Between the anchor member 106 and the adjuster 108, a pair of arc-shaped brake shoes 110a and 110b are arranged so as to face the inner peripheral face of the drum 104. The brake shoes 110a and 110b are fitted to the backing plate 100 by shoe-hold-down devices 112a and 112b, respectively, so as to be movable along the backing plate 100. A through-hole is formed at the center of the backing plate 100 to allow an axle shaft (not shown) to pass through the through-hole.

The brake shoe 110a and the brake shoe 110b are operatively connected, at their one ends, to each other by the adjuster 108. Meanwhile, the other ends of the brake shoe 110a and the brake shoe 110b are pivotally supported by the anchor member 106. The one ends of the brake shoes 110a and 110b are biased by an adjuster spring 114 such that the one ends of the brake shoes 110a and 110b approach the adjuster 108, while the other ends of the brake shoes 110a and 110b are biased by a return spring 115 such that the other ends of the brake shoes 110a and 110b approach the anchor member 106. Brake linings 116a and 116b, which serve as friction members, are held on the outer peripheral faces of the brake shoes 110a and 110b, respectively. When the brake linings 116a and 116b contact the friction face 102 of the drum 104, a frictional force is produced between the brake linings 116a and 116b, and the drum 104. The adjuster 108 is operated to adjust the amount of clearance between the paired brake linings 116a and 116b, and the drum 104 in accordance with the degree of wearing of the brake shoes 110a and 110b.

FIG. 5 shows a pushing mechanism 120. The pushing mechanism 120 includes a brake lever 122 and a strut 124. The pushing mechanism 120 is supported by the top portions of bolts 138 and 140 with which the anchor member 106 is fixed to the backing plate 100 so as to be movable relative to the top portions of the bolt 138 and 140. The brake lever 122 and the strut 124 are plate-like members. The brake lever 122 is interposed between two plate members that form the strut 124. In this state, the brake lever 122 and the strut 124 are connected, at their one ends, to a connecting shaft 126 so as to be pivotal with respect to each other. The brake lever 122 has a fit portion 128 that is formed at a position between the connecting shaft 126 and the backing plate 100. The brake shoe 110a is fitted to the fit portion 128. The inner cable 87 of the cable 22 is connected to a fit portion 130 formed at the end portion that is apart from the connecting shaft 126 in the direction parallel to the backing plate 100. The inner cable 87 is guided by an outer tube 134, of which one end is fixed at a through-hole 132 formed in the backing plate 100, and juts out the backing plate 100 and extends from the face opposite to the face on which the brake shoes 110a and 110b are arranged. The strut 124 has a fit portion 135 that is formed at the end portion on the opposite side of the connecting shaft 126. The brake shoe 110b is fitted to the fit portion 135. In the state shown in FIG. 5, the fit portion 130 is positioned on the reverse rotational direction side with respect to the center axis N of the through-hole 132 (the center axis N of the cable 22, at a position at which the cable 22 is fixed to the backing plate 100). As described below, when the pushing mechanism 120 is relatively moved in the circumferential direction, the fit portion 130 also relatively moves in accordance with the movement of the pushing mechanism 120. However, the fit portion 130 is designed not to move to the position on the forward rotational direction side with respect to the center axis N.

The pushing mechanism 120 is supported, at supported portions 136 and 137, by the top portions of the bolts 138 and 140, respectively. When the inner cable 87 is pulled, the brake lever 122 pivots about the contact point between the supported portion 136 and the top portion of the bolt 138. As a result, the connecting shaft 126 and the strut 124 are moved rightward in FIG. 5, and the strut 124 pushes the brake shoe 110b rightward. At this time, a reaction force from the brake shoe 110b is transferred to the brake shoe 110a through the strut 124, the connecting shaft 126 and the brake lever 122, and therefore the brake shoe 110a is pushed leftward in FIG. 5. The same degree of applying force is applied to each of the brake shoes 110a and 110b such that the brake shoes 110a and 110b are each pushed out against the drum 104. As a result, the brake linings 116a and 116b are pushed against the inner peripheral face (the friction face) 102 of the drum 104 with the same degree of force. The tension of the cable 22 is amplified based on the arm ratio of the brake lever 122, and the applying force, which is obtained by subtracting the force corresponding to the frictional force between the supported portions 136 and 137, and the top portions of the bolts 138 and 140 from the amplified force, is applied to the brake shoes 110a and 110b.

Figure 13:
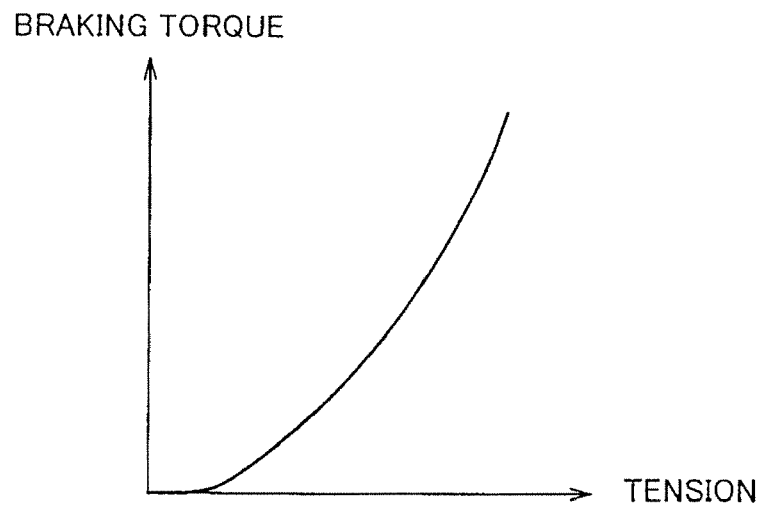
FIG. 13 is a map showing the table of the relationship between the braking torque and the tension of a cable, which is stored in the storage unit of the electric parking brake ECU.

If the drum brake 18 is applied when a torque is applied to the drum 104, a force is applied from the drum 104 to the brake shoes 110a and 110b in the circumferential direction, and one of the brake shoes 110a and 110b contacts the anchor member 106, whereby so-called duo-servo effect is produced. If a torque is applied in the forward rotational direction (the direction in which the wheel rotates when a vehicle moves forward) P, due to the self-servo effect, the brake shoe 110a is pushed against the drum 104 with a larger force than when the brake shoe 110a is pushed against the drum 104 with only the applying force (the pressure applied per unit area of the portion, at which the brake shoe 110a contacts the drum 104, increases). The force in the circumferential direction due to the self-servo effect together with the applying force is transferred to the brake shoe 110b by the adjuster 108. As a result, the brake shoe 110b is pushed against the drum 104 stronger than the brake shoe 110a is. The brake shoe 110b contacts the anchor member 106, whereby a braking torque is produced. On the other hand, when a torque is applied in the reverse rotational direction (the direction in which the wheel rotates when the vehicle backs up) Q, the brake shoe 110a is pushed against the drum 104 stronger than the brake shoe 110b is. The degree of force with which the brake shoes 110a and 110b push the friction members against the drum 104 (hereinafter, referred to as the "friction member pushing force") corresponds to the degree of tension of the cable 22. The relationship between the tension and the braking torque is expressed by the curve shown in the FIG. 13. When the vehicle is at a standstill and the coefficient of friction between the brake linings 116a and 116b and the inner peripheral face (the friction face) 102 of the drum 104 is constant, a certain relationship is established among the braking torque, the frictional force, the friction member pushing force and the applying force. As the applying force increases, the friction member pushing force, the frictional force and the braking torque also increase. Accordingly, for example, based on the relationship between the tension and the applying force, it is possible to determine the relationship between the tension and the friction member pushing force, the relationship between the tension and the frictional force, and the relationship between the tension and the braking torque.

As described so far, the drum brake 18 is symmetric except the pushing mechanism 120, in FIG. 4, and the same degree of applying force is applied to each of the brake shoes 110a and 110b. Accordingly, when the same degree of tension is applied to the cable 22, the same degree of braking torque is supposed to be obtained regardless of whether the torque is applied in the forward rotational direction P or the reverse rotational direction Q. However, it became obvious through experiments, etc. that, even when the same degree of tension is applied to the cable 22 in the drum brake 18, the average braking torque obtained is lower when the braking torque is applied in the forward rotational direction P than when the braking torque is applied in the reverse rotational direction Q. Also, it is known that, while the drum brake 18 is on, when a torque is applied or when the applied torque changes, the cable slacks and the braking torque is reduced. In this case as well, it became obvious through experiments, etc. that a decrease in the braking torque tends to be larger when a torque is applied in the forward rotational direction P than when a torque is applied in the reverse rotational direction Q. The reasons why the degree of obtained torque and the decrease in the braking torque due to slack vary depending on whether the torque is applied in the forward rotational direction P or in the reverse rotational direction Q are estimated as described below, although not having been clarified yet.

The first reason is that the braking torque that can be produced by the drum brake 18, with respect to the same degree of tension of the cable 22, when the duo-servo effect is produced varies depending on whether a torque is applied to the drum 104 in the forward rotational direction P or in the reverse rotational direction Q. A second reason is as follows. For example, when the brake shoes 110a and 110b are pushed against the inner peripheral face of the drum 104 while the rotational torque is not applied to the drum 104, and then a torque is applied to the drum 104, the cable 22 slacks as the state shifts to the duo-servo state. It is estimated that the amount of slack varies depending on whether the torque is applied in the forward rotational direction P or in the reverse rotational direction Q. The first reason will be referred to as the "braking torque difference in the duo-servo state", and the second reason will be referred to as the "braking torque difference due to a shift to the duo-servo state" (may be referred to as the "braking torque difference due to a movement of the drum brake component, for example, the brake shoe in the circumferential direction"). The cause of the "braking torque difference in the duo-servo state" and the cause of the "braking torque difference due to a shift to the duo-servo state" will be described below.

First, the cause of the "braking torque difference in the duo-servo state" will be described. As described above, when a torque is applied to the drum 104, as described above, due to the duo-servo effect, one of the brake shoes 110*a* and 110*b* contacts the anchor member 106 and the brake shoe that contacts the anchor member 106 is especially strongly pushed against the drum 104, whereby a high braking torque is obtained. However, even in at this time, the drum brake 18 has not been brought into a perfect duo-servo state, namely, the drum 104 and the brake shoes 110*a* and 110*b* are partially not closely contact each other at a sufficient level. It is estimated that the state of the insufficient contact portion varies depending on whether a torque is applied to the drum 104 in the forward rotational direction P or in the reverse rotational direction Q. The validity of the estimation has not been confirmed yet, because it is difficult to strictly check the state of contact between the outer peripheral faces of the brake linings 116*a* and 116*b* and the inner peripheral face (the friction face) 10 of the drum 104 in the state in which the duo-servo effect is produced. However, it is confirmed through experiments that the "braking torque difference in the duo-servo state" is present.

Next, the cause of the "braking torque difference due to a shift to the duo-servo state" will be described. For example, while a rotational torque is not applied to the drum 104, when the brake shoes 110*a* and 110*b* are pushed against the inner peripheral face (the friction face) 102 of the drum 104 and then a torque is applied to the drum 104, the brake shoes 110*a* and 110*b* rotate together with the drum 104. In accordance with the rotation of the brake shoes 110*a* and 110*b*, the components (the components that are movable in the circumferential direction) of the drum brake 18 such as the adjuster 108 and the pushing mechanism 120 move in the circumferential direction. Before the torque is applied to the drum 104, the outer peripheral faces of the brake shoes 110*a* and 110*b* (the brake linings 116*a* and 116*b*) and the inner peripheral face (the friction face) 102 of the drum 104 are usually not completely closely contact each other. When a torque is applied to the drum 104 and the brake shoes 110*a* and 110*b*, the pushing mechanism 120, etc. rotate together with the drum 104, the clearance left between the outer peripheral faces of the brake shoes 110*a* and 100*b* and the inner peripheral face (the friction face) 102 of the drum 104 is reduced. With such a reduction in the clearance, the inner cable 87 of the cable 22 slacks. When the tension of the cable 22 is reduced, the braking torque is also reduced. The inner cable slacks both when a torque is applied to the drum 104 in the forward rotational direction P and when a torque is applied to the drum 104 in the reverse rotational direction Q. It is considered that one of the causes of the "braking torque difference due to a shift to the duo-servo state" is that the slack in the inner cable 87 varies depending on whether the torque is applied to the drum 104 in the forward rotational direction P or in the reverse rotational direction Q by the same cause of the "braking torque difference in the duo-servo state".

It is considered that another cause of the "braking torque difference due to a shift to the duo-servo state" is that the influence of the direction in which the inner cable 87 of the cable 22 is routed varies depending on whether a torque is applied to the drum 104 in the forward rotational direction P and in the reverse rotational direction Q. In the embodiment of the invention, the inner cable 87 is routed so as to tilt in the clockwise direction with respect to the center axis N such that the cable fit portion 130 is positioned on the right side with respect to the center axis N, as shown in FIG. 5. This is considered to be the cause of the "braking torque difference due to a shift to the duo-servo state". When a torque is applied to the drum 104 in the forward rotational direction P, the brake shoes 110*a* and 110*b*, the pushing mechanism 120, etc. are moved on the whole in the forward rotational direction P relative to the backing plate 100 in accordance with the rotation of the drum 104. At this time, the position of the cable fit portion 130 of the brake lever 122 relative to the backing plate 100 is shifted from the position X to the position X', and the distance between the center point O of the through-hole 132 formed in the backing plate 100 (the fixed point indicating the position on the backing plate 100, above which the inner cable 87 is constantly present) and the cable fit portion 130 is reduced (OX>OX'), whereby the tension of the inner cable 87 is reduced. In contrast, when a torque is applied to the drum 104 in the reverse rotational direction Q, the brake shoes 110*a* and 110*b*, the pushing mechanism 120, etc. are moved on the whole in the reverse rotational direction Q relative to the backing plate 100. At this time, when the cable fit portion 130 is moved from the position X to the position X", the distance between the center point O and the cable fit portion 130 is increased (OX<OX"), and the inner cable 87 is pulled and the tension of the cable 87 is increased.

The cable fit portion 130 is not always at the position X when the application of a torque in the forward rotational direction P or the reverse rotational direction Q is started. For example, the cable fit portion 130 is sometimes near the position X' at this time. In such a case, the cable fit portion 130 moves to the position X' for only a short distance. Therefore, the tension of the inner cable 87 is reduced only slightly. Similarly, when the cable fit portion 130 is near the position X" when the application of a torque in the reverse rotational direction Q is started, the cable fit portion 130 moves to the position X" for a only short distance. Accordingly, the tension of the inner cable 87 is increased only slightly. In contrast, the cable fit portion 130 is sometimes near the position X" when the application of a torque in the forward rotational direction P is started. In this case, the cable fit portion 130 moves from a position near the position X" to the position X. In this case, the tension of the cable 87 is reduced by a larger amount than when the cable fit portion 130 is moved from the position X to the position X'. The cable fit portion 130 is sometimes near the position X' when the application of a torque in the reverse rotational direction Q is started. In this case, the cable fit portion 130 moves from a position near the position X' to the position X". In this case, the tension of the inner cable 87 increases by a larger amount than when the cable fit portion 130 moves from the position X to the position X".

As described above, a rotational torque is applied to the drum 104 while the brake shoes 110*a* and 110*b* are pushed against the drum 104 by the pushing mechanism 120. As the brake shoes 110*a* and 110*b*, the pushing mechanism 120, etc. rotate together with the drum 104, the tension of the inner cable 87 changes. The amount of change varies depending on the position of the cable fit portion 130 when the application of a rotational torque to the drum 104 is started. When a torque is applied to the drum 104 in the forward rotational direction P, the tension of the inner cable 87 tends to be reduced. On the other hand, when a torque is applied to the drum 104 in the reverse rotational direction Q, the tension of the inner cable 87 tends to increase. These tendencies do not vary depending on the position of the cable fit portion 130 when application of the rotational torque to the drum 104 is started. It is estimated that this is one of the causes of the "braking torque difference due to a shift to the duo-servo state".

As described above, although the reason has not been clarified yet, even when the tension of the cable 22 (the inner cable 87) is controlled to be the same, the braking torque obtained is smaller when a torque is applied to the drum 104 in the forward rotational direction P than when a torque is applied to the drum 104 in the reverse rotational direction Q. Namely, even when the electric motor 10 is controlled such that the tension of the cable 22 reaches the target tension regardless of whether a torque is applied to the wheel 14 in the forward rotational direction P or a torque is applied to the wheel 14 in the reverse rotational direction Q, the target tension is not obtained. The friction member pushing force and the tension applied to the cable 22 are smaller when the torque is applied to the wheel 14 in the forward rotational direction P than when the torque is applied to the wheel 14 in the reverse rotational direction Q. In other words, in order to obtain the same degree of braking force regardless of whether the torque is applied to the wheel 14 in the forward rotational direction P or the torque is applied to the wheel 14 in the reverse rotational direction Q, the target tension for the cable 22 needs to be larger when the torque is applied to the wheel 14 in the forward rotational direction P than when the torque is applied to the wheel 14 in the reverse rotational direction Q.

Figure 14:
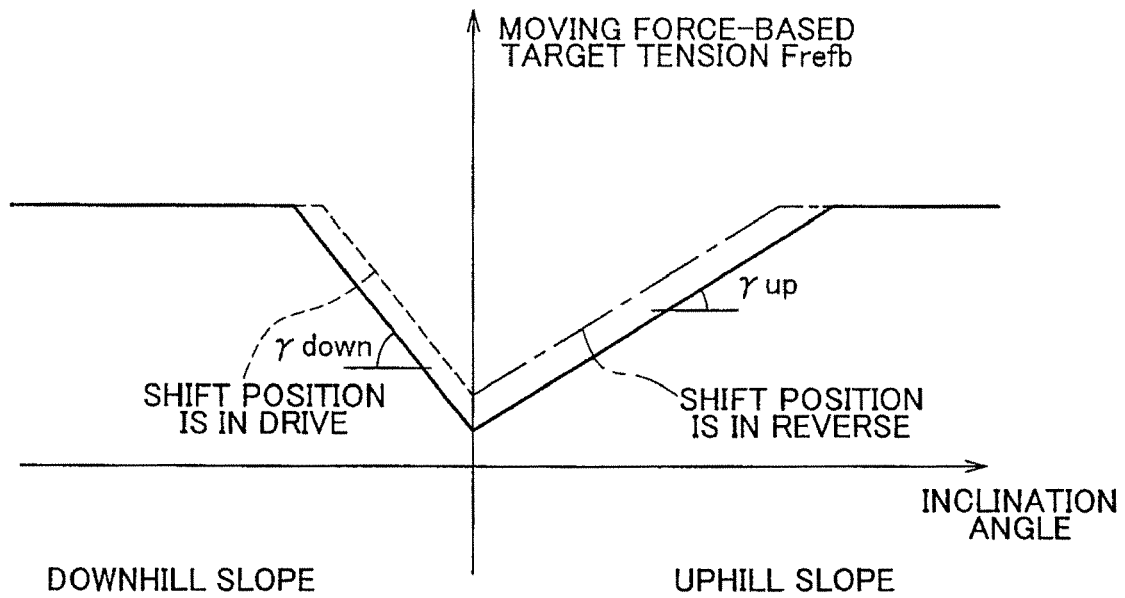
FIG. 14 is a map showing the table of the relationship between the inclination angle of the vehicle and the moving force-based target tension, which is stored in the storage unit.

When the vehicle is on a downhill slope, a torque is applied to the wheel 14 in the forward rotational direction P. When the vehicle is on an uphill slope, a torque is applied to the wheel 14 in the reverse rotational direction Q. Accordingly, in the embodiment of the invention, the target tension, which is the tension of the cable 22 that is required to keep the vehicle at a standstill on a slope using the effect of the parking brake 18, is set to a higher value when the vehicle needs to be kept at a standstill on a downhill slope (when a torque is applied to the wheel 14 in the forward rotational direction P) than when the vehicle is kept at a standstill on an uphill slope (when a torque is applied to the wheel 14 in the reverse rotational direction Q) such that the "braking torque difference in the duo-servo state" is minimized. FIG. 14 shows the relationship between the target tension and the inclination angle of the vehicle in this case. As shown by the solid line in FIG. 14, even when the absolute value of the inclination angle of the road is the same (the degree of the torque applied is the same), the target tension is set to a larger value when the vehicle is kept at a standstill on a downhill slope than when the vehicle is kept at a standstill on an uphill slope {the absolute value of the inclination of the target tension with respect to the inclination angle of the vehicle on a downhill slope ($|\gamma\text{down}|=\Delta\text{Frefb}/\Delta\theta$) is larger than the inclination of the target tension with respect to the inclination angle of the vehicle on an uphill slope ($\gamma\text{up}=\Delta\text{Frefb}/\Delta\theta$) ($|\gamma\text{down}|>\gamma\text{up}$)}. The torque applied to the wheel 14 due to the effect of a slope is not associated with a drive power applied by a drive unit of the vehicle. In other words, even when a driver power is not applied (when the shift position of a transmission is in Neutral or Park), the target tension is set to a larger value when the vehicle is kept at a standstill on a downhill slope than when the vehicle is kept at a standstill on an uphill slope. As described above, the target tension is set to a value at which the vehicle is kept at a standstill on a slope, and set based on the moving force applied to the vehicle. Accordingly, the target tension will be referred to as the "moving force-based target tension". The moving force-based target tension may be referred to as the required parking tension or required maintenance tension.

However, it is known that, even when the inclination angle of the road is 0 degree and the shift position is in Neutral, the parking brake 18 needs to be applied because the vehicle may move even in this situation. Although not having been clarified yet, the reason for this is estimated to be a torque applied to the wheel due to, for example, a distortion of a suspension member. Such torque is produced even when the inclination angle of the road is 0 degree and the shift position is in Neutral.

As described in the "braking torque difference due to a shift to the duo-servo state", while a rotational torque is not applied to the drum 104, when the brake shoes 110*a* and 110*b* are pushed against the inner peripheral face of the drum 104 and then a rotational torque is applied to the drum 104, the cable 22 slacks and therefore a braking torque produced by the drum brake 18 is reduced. For example, while the vehicle is kept at a standstill on a slope due to the effort of the service brake 99, when the parking brake 18 is applied and then the service brake 99 is released, a torque is applied to the vehicle due to the effect of the slope. In such a case, a braking torque produced by the drum brake 18 is reduced. When a torque applied to the drum 104 changes in the duo-servo state, the cable 22 slacks and therefore the braking torque produced by the drum brake 18 is reduced. As described above in the "braking torque difference in the duo-servo state", a clearance is left between the outer peripheral faces of the brake shoes 110*a* and 110*b* and the inner peripheral face of the drum 104 in the duo-servo state. Accordingly, when the torque is changed in this state, it is considered that the cable 22 slacks, as described above in the "braking torque difference due to a shift to the duo-servo state". For example, while the vehicle is kept at a standstill due to the effort of the parking brake 18, when the shift position is changed by the shift operation, a driving torque applied to the wheel changes. In such a case, the cable 22 slacks. In each of the cases, as described above in the "braking torque difference due to a shift to the duo-servo state", the amount of decrease in the braking torque due to the slack in the cable 22 is larger when the torque is applied to the drum 104 in the forward rotational direction P than when the torque is applied to the drum 104 in the reverse rotational direction Q. Hereinafter, a torque applied to the drum brake 18 due to a change in the applied torque, that is, a newly applied torque, will be referred to as an input torque.

Figure 15:
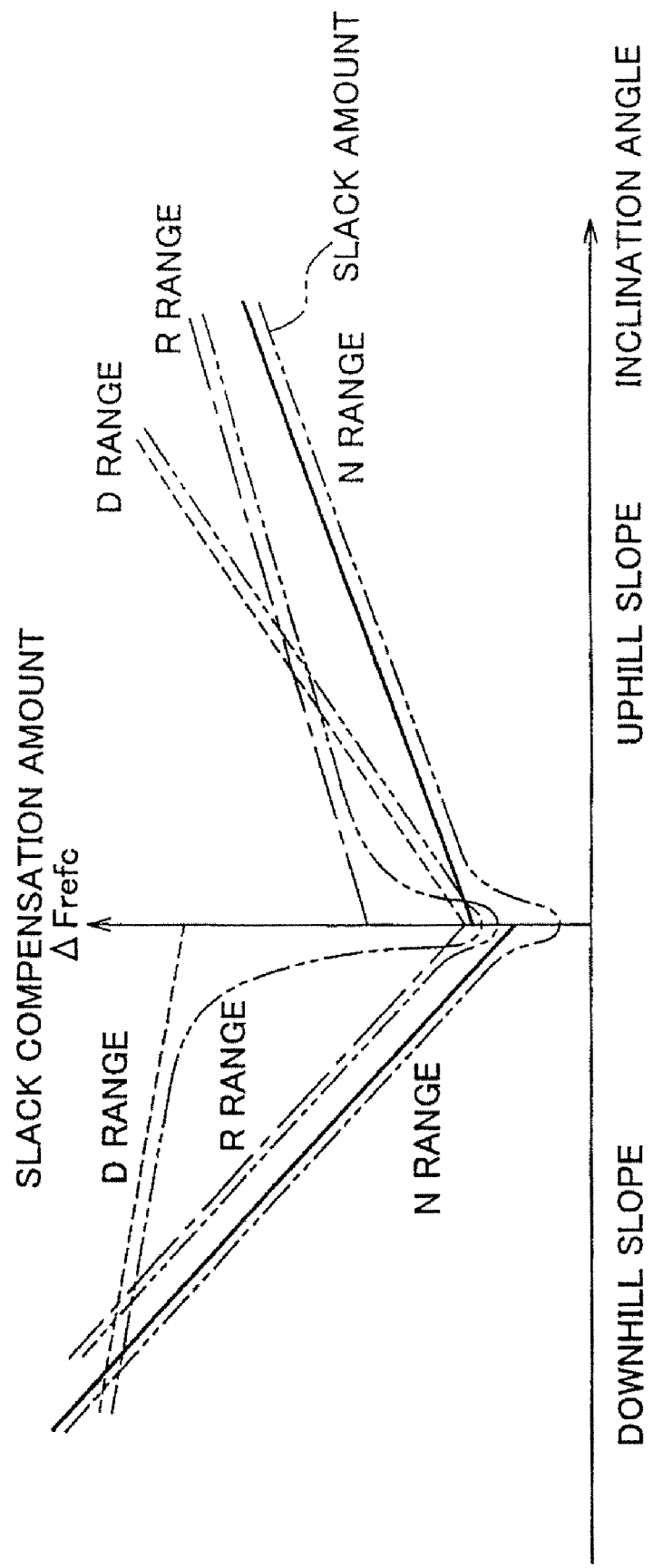
FIG. 15 is a map showing the table of the relationship between the inclination angle of the vehicle and the slack compensation amount, which is stored in the storage unit.

An example of the relationship between the amount of slack in the cable 22 and the input torque, which is actually obtained through experiments, is indicated by the dashed-two dotted line in FIG. 15. As shown in FIG. 15, in the case where the direction in which the input torque is applied is the same, the amount of slack in the cable 22 is larger when the input torque is high than when the input torque is low. The input torque is higher when the absolute value of the inclination angle of the road is large than when the absolute value of the inclination angle of the road is small. If the rotational speed of the drive unit is the same, the input torque is higher when the shift position of the transmission at the release time of the disc brake 99 is in Drive or Reverse than when the shift position of the transmission at the release time of the disc brake 99 is in Neutral. As shown in FIG. 15, the relationship between the inclination angle of the vehicle and the amount of slack when the vehicle is at a standstill on an uphill slope and the shift position is in Drive is similar to that when the vehicle is at a standstill on a downhill slope and the shift position is in Reverse. Also, the relationship between the inclination angle of the vehicle and the amount of slack when the vehicle is at a standstill on an uphill slope and the shift position is in Reverse is similar to that when the vehicle is at a standstill on a downhill slope and the shift position is in Drive. The amount of slack in the cable 22 is larger when the friction member pushing force (the force with which the brake shoes 110a and 110b push the friction members against the inner peripheral face (the friction face) 102 of the drum 104, and which corresponds to the tension of the cable 22) in the drum brake 18, which is on, is large than when the friction member pushing force is small, an a torque is applied. Because the tension of the cable 22 in the drum brake 18 that is applied in the duo-servo state is controlled based on the moving force-based target tension in the embodiment of the invention, the tension of the cable 22 is larger when the absolute value of the inclination angle of the vehicle is large than when the inclination angle of the vehicle is small.

In the embodiment of the invention, as described later in detail, in order to avoid insufficiency of the braking torque due to the slack in the cable 22, which is caused when the disc brake 99 is released after the drum brake 18 is applied, the target tension for the cable 22 is set to the value obtained by adding the slack compensation amount (the additional tension that is used to compensate for a reduction in the braking torque due to the slack in the cable 22) to the moving force-based target tension when the drum brake 18 is applied. The slack compensation amount is set as indicated by the solid lines, the dashed-dotted lines, and the dashed lines in FIG. 15 to minimize the "braking torque difference in the duo-servo state" and the "braking torque difference due to a shift to the duo-servo state". The slack compensation amount is the value corresponding to the amount of slack in the cable 22. The slack compensation amount is set to a larger value when the amount of slack in the cable 22 is large than when the amount of slack in the cable 22 is small. According to the embodiment of the invention, the slack compensation amount is set to a value that is slightly larger than the value corresponding to the amount of slack in the cable 22. The relationship among the slack compensation amount, the shift position (Neutral, Drive, Reverse), and the inclination angle of the vehicle is indicated in a table, and stored in an electric parking brake ECU 200.

As shown in FIG. 1, the electric motor 10 is controlled based on a command from the electric parking brake ECU 200. The electric parking brake ECU 200 is formed mainly of a computer, and includes an input/output unit 202, an execution unit 204, a storage unit 206, etc. A parking brake switch (hereinafter, simply referred to as a "parking switch") 210 and the tension sensor 90 (see FIGS. 2 and 6) are connected to the input/output unit 202. In addition, the electric motor 10 is connected to the input/output unit 202 via a drive circuit 212. The electric motor 10 is an actuator of the electric parking brake. The electric parking brake ECU 200 is connected, via a CAN (Controller Area Network) 214, to the other computers mounted in the vehicle such as a slip control ECU (VSC ECU) 220 and an engine/transmission ECU (ETC ECU) 222. In addition, the electric parking brake ECU 200 is connected to a temperature sensor 224, an ignition switch 225, etc. A longitudinal acceleration sensor 226 and a wheel speed sensor 227 are connected to the slip control ECU 220. A shift position sensor 228 is connected to the engine/transmission ECU 222. Therefore, the information including the vehicle speed, the longitudinal acceleration, and the shift position is transmitted to the electric parking brake ECU 200 via the slip control ECU 220, the engine/transmission ECU 222, and the CAN 214.

The parking switch 210 is operated to issue a command to apply the parking brakes 18 and 20 or a command to release the parking brakes 18 and 20. The parking switch 210 may include, for example, an application operation unit and a release operation unit. When the application operation unit is operated (hereinafter, referred to as "when the application command operation is performed"), it is determined that the parking brakes 18 and 20 are required to be applied. When the release operation unit is operated (hereinafter, referred to as "when the release command operation is performed"), it is determined that the barking brakes 18 and 20 are required to be released. In the embodiment of the invention, the shift position sensor 228 detects the shift position based on the state of the transmission (for example, the state of electric current supply to a solenoid of a solenoid valve (i.e., the shift position)). Alternatively, the shift position sensor 228 may detect the position of a shift operation member, because it is considered that the shift position corresponds to the position of the shift operation member when the vehicle is at a standstill.

Figure 6:
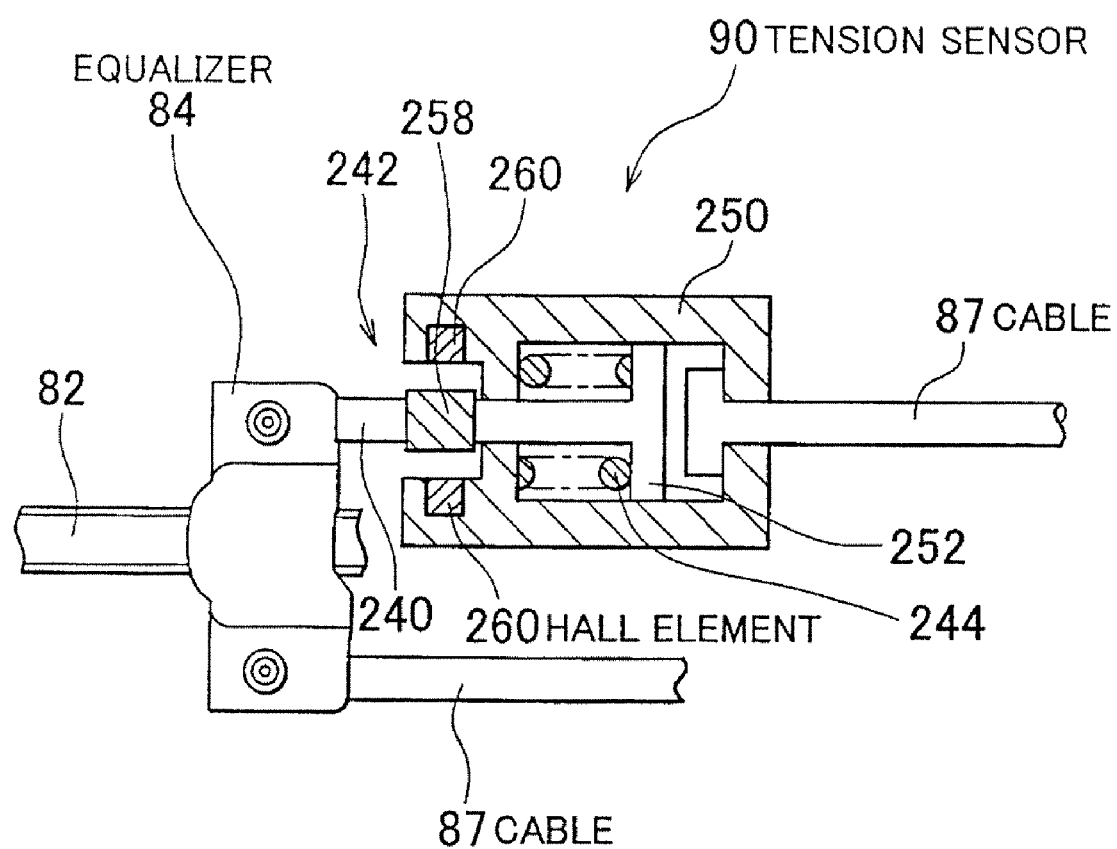
FIG. 6 is a view showing a tension sensor included in the electric parking brake system.

As described above, the tension sensor 90 detects the tension of the cable 22 and the tension of the cable 24. As shown in FIG. 6, the tension sensor 90 is arranged between a piston rod 240 fixed to the equalizer 84 and the inner cable 87 of the cable 24. The piston rod 240 and the cable 24 correspond to the "two partial cables obtained by dividing one cable". The tension sensor 90 includes a relative movement amount detection unit 242, and a spring 244. The tension sensor 90 determines the tension F by multiplying the relative movement amount $\Delta s$ of the cable 24 (the inner cable) with respect to the piston rod 240, by the spring coefficient K of the spring 244 ($F=K \times \Delta s$). The tension sensor 90 includes a housing 250 that serves as a first member, a piston 252 that serves as a second member and that is movable relative to the housing 250, the spring 244 that is arranged between the housing 250 and the piston 252, a magnet 258 that is provided on the piston rod 240 of the piston 252, a hall element (a semiconductor) 260 that is provided in the housing 250, etc. The cable 24 is fitted to the housing 250 such that the cable 24 is immovable relative to the housing 250. The spring 244 is provided between the face of the piston 252, which is proximal to the piston rod 240, and the inner face of the housing 250. The spring 244 biases the cable 24 such that the cable 24 approaches the piston rod 240 (such that the piston rod 240 and the cable 24, which are the two partial cables, approach each other). When the equalizer 84 is moved leftward in FIG. 6, a tension is applied to the cable 24. Then, the piston 252 is moved relative to the housing 250 such that the piston rod 240 and the cable 24, that are the two partial cables, move away from each other, and the spring 244 is compressed. The relative positional relationship between the magnet 258 and the hall element 260 changes in accordance with a relative movement between the housing 250 and the piston 252. In accordance with this change, the magnetic flux density (the number of magnetic lines) changes, and the output voltage from the hall element 260 also changes. Based on a change in the output voltage, the relative movement amount $\Delta s$ between the housing 250 and the piston 252 is determined.

Figure 7A:
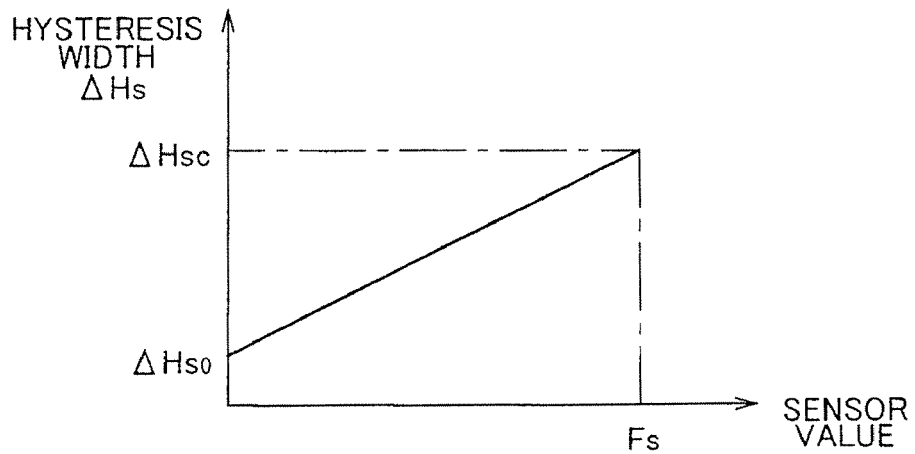
FIG. 7A and FIG. 7B are graphs showing the hysteresis characteristics of the tension sensor.
Figure 7B:
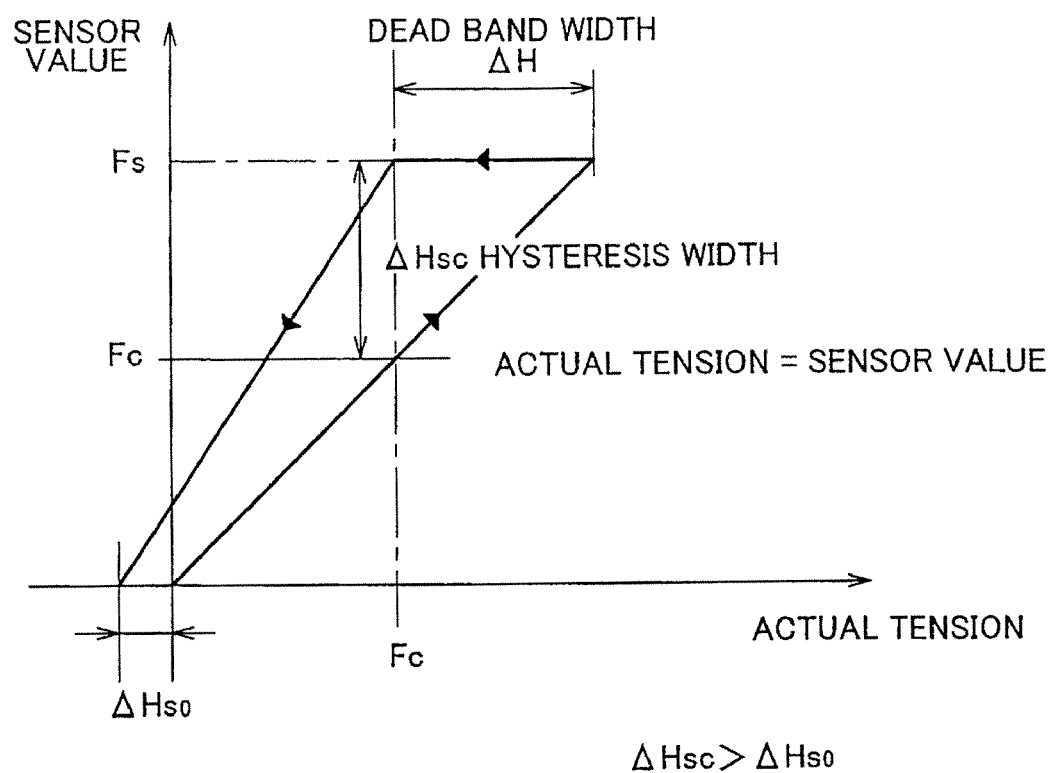

As described so far, the tension sensor 90 detects the tension based on the relative movement amount between the housing 250 and the piston 252. The tension sensor 90 has hysteresis characteristics due to the vibration caused by the relative movement between the housing 250 and the piston 252, the friction caused by the relative movement between the housing 250 and the piston 252, the friction between the spring 244, and the piston 252 and the housing 250, etc. As shown in FIG. 7B, when the tension increases and then decreases, the value output from the tension sensor 90 (hereinafter, referred to as the "sensor value") is maintained at a constant value and then decreases. According to the hysteresis characteristics of the tension sensor 90, as shown in FIGS. 7A and 7B, the hysteresis width $\Delta Hs$ {the value obtained by subtracting the actual value (the true value) Fc from the sensor value Fout (ΔHs=Fout-Fc)} is larger when the sensor value Fout is large than when the sensor value Fout is small. The relationship between the sensor value Fout and the hysteresis width ΔHs is obtained in advance and stored in the storage unit 204. When the tension sensor 90 has the hysteresis characteristics shown in FIG. 7B, the width ΔH of the dead band is equal to the hysteresis width ΔHsc independently of the sensor value Fout. Therefore, it is considered that the tension sensor 90 has the hysteresis characteristics according to which the width ΔH of the dead band is wider when the sensor value Fout is large than when the sensor value Fout is small. Based on the sensor value Fout and the hysteresis width ΔHs corresponding to the sensor value Fout, the actual tension Fc may be determined according to the equation, Fc=Fout−ΔHs.

Figure 8A:
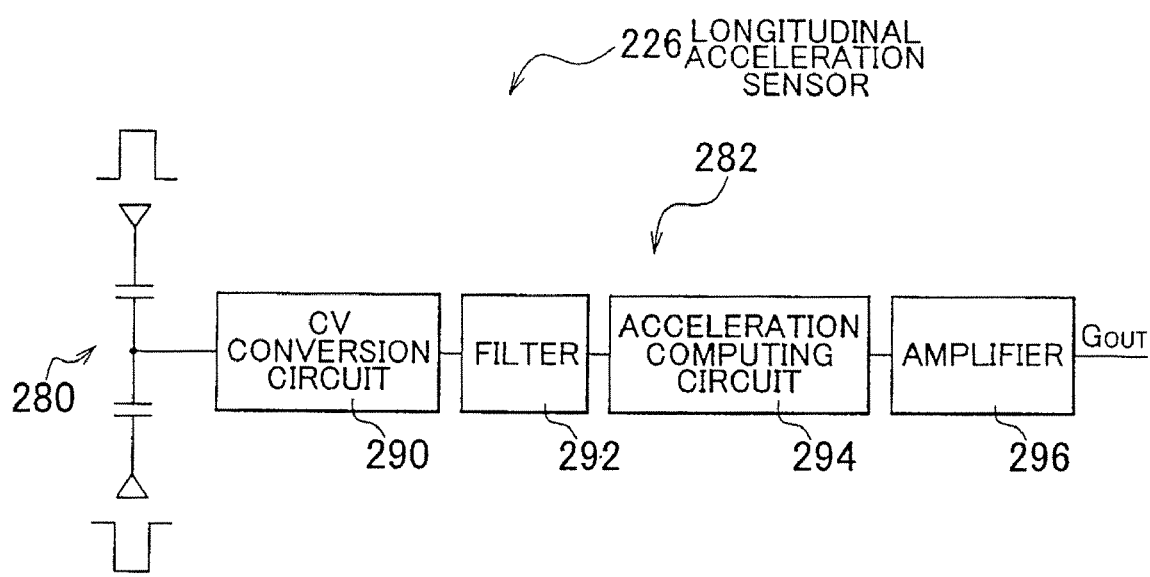
FIG. 8A is a diagram conceptually showing a longitudinal acceleration sensor included in the electric parking brake system.
Figure 8B:
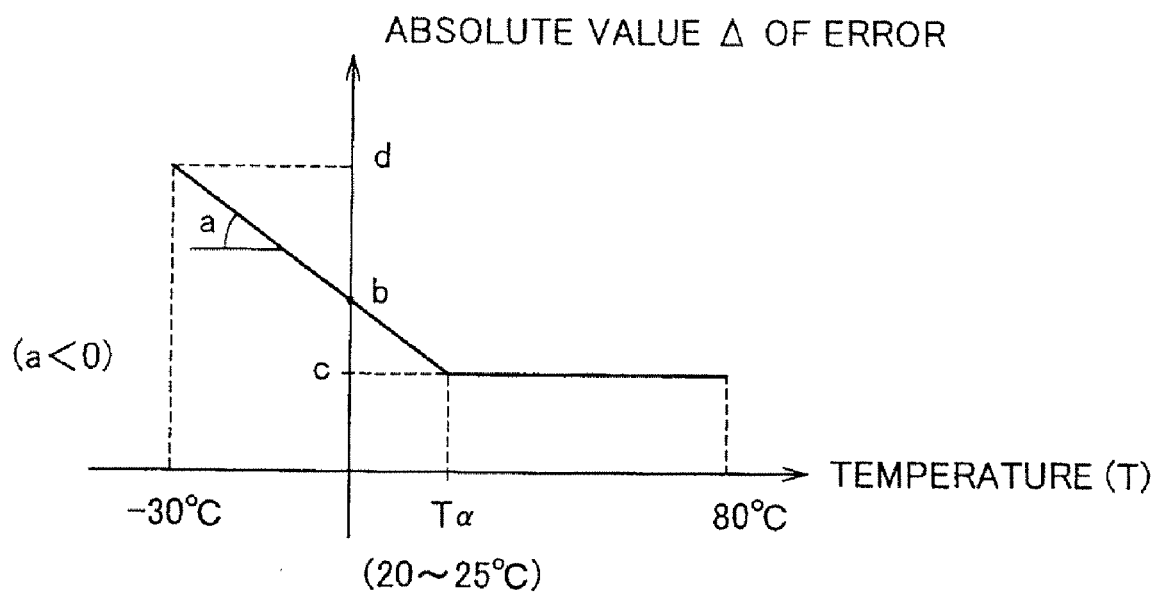
FIG. 8B is a graph showing the temperature characteristics of the longitudinal acceleration sensor.

The longitudinal acceleration sensor 226 is a capacitance sensor, and provided to a center console that is positioned at substantially the center in the lateral direction of the vehicle. Namely, the longitudinal acceleration sensor 226 is provided on a floor tunnel (a steel plate), which forms the center console, at a position on the passenger compartment side. As shown in FIG. 8A, the longitudinal acceleration sensor 226 includes a condenser 280, and an electric circuit 282. In the condenser 280, the distance between paired electrode plates changes in accordance with a force (acceleration) applied to the vehicle in the longitudinal direction. The electric circuit 282 causes the condenser 280 to be charged with electricity and to discharge electricity under a constant voltage difference between the electrode plates, and determines the amount of electric charge, which is stored in the condenser 280 as a result of charging/discharging of electricity. The electric circuit 282 then determines the voltage based on the amount of electric charge, and detects the acceleration based on the voltage. The electric circuit 282 includes a CV conversion circuit 290, a filter 292, an acceleration computing circuit 294, an amplifier 296, etc. The CV conversion circuit 290 determines the voltage V based on the amount Q of the electric charge stored in the condenser 280, and the filtering process is executed on the voltage V by the filter 292. A signal indicating the value determined through the filtering process is transmitted to the acceleration computing circuit 294, and the acceleration is determined according to an equation. The determined acceleration is amplified by the amplifier 296 and then output. In the condenser 280, the relationship among the amount Q of the electric charge, the voltage difference V and the capacitance C of the condenser 280 is expressed by the equation, Q=V×C. When the distance between the electrode plates is "d", the area of the electrode plate is "S", and the dielectric constant is "∈0", the capacitance C is expressed by the equation, C=∈0×S/d. Based on these two equations, the equation Q=V×∈0×S/d is obtained. Because ∈0 and S are constants, when the voltage difference V is constant, the amount Q of the electric charge is larger when the distance d is short than when the distance d is long. Namely, the amount Q of the electric charge is larger and the voltage output from the CV conversion circuit 290 is higher when the force applied in the longitudinal direction (the acceleration) is large and the distance d is short than when the force applied in the longitudinal direction (the acceleration) is small and the distance d is long. Based on the output voltage and the equation, the longitudinal acceleration is determined by the acceleration computing circuit 294. The constant in the equation used by the acceleration computing circuit 294 is set such that a permissible variation (the absolute value of an error) is larger when the temperature of the longitudinal acceleration sensor 226 is low than when the temperature of the longitudinal acceleration sensor 226 is high (equal to or higher than the ordinary temperature). As a result, the accuracy of the determination is higher and the detected value is closer to the actual value when the temperature of the longitudinal acceleration sensor 226 is high than when the temperature of the longitudinal acceleration sensor 226 is low. FIG. 8B shows the temperature error characteristics of the longitudinal acceleration sensor 226. The temperature error characteristics within the temperature range from −30° C. to 80° C., in which vehicles are usually used, are prepared. When the temperature of the longitudinal acceleration sensor 226 is higher than the reference temperature Tα, the absolute value Δ of an error is a small and constant value c. On the other hand, when the temperature of the longitudinal acceleration sensor 226 is equal to or lower than the reference temperature Tα, the absolute value Δ of an error is larger than the absolute value Δ of an error when the temperature of the longitudinal acceleration sensor 226 is higher than the reference temperature Tα. As the temperature T of the longitudinal acceleration sensor 226 decreases, the absolute value Δ of an error increases. The reference temperature Tα is a value, for example, between approximately 20° C. and approximately 25° C.

$$\Delta = c (T > T\alpha) \quad \text{Equation 1}$$

$$\Delta = aT + b (T \leq T\alpha) \quad \text{Equation 2}$$

Figure 8C:
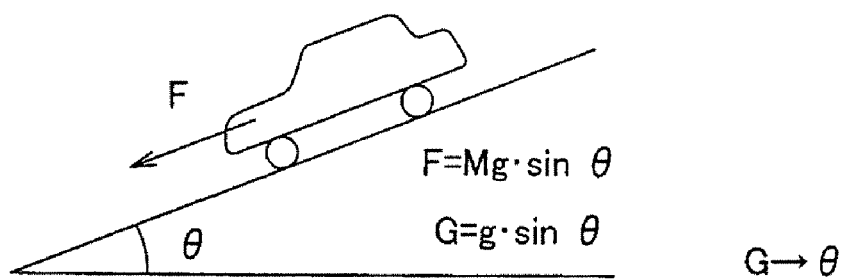
FIG. 8C is a view showing the relationship between the longitudinal acceleration applied to a vehicle and the inclination angle of the vehicle.

The longitudinal acceleration sensor 226 detects the acceleration applied in the longitudinal direction of the vehicle. According to the embodiment of the invention, the inclination angle of the vehicle in the longitudinal direction is detected based on the longitudinal acceleration. When the vehicle body is in parallel to the road surface, the inclination angle of the vehicle is equal to the inclination angle θ of the road on which the vehicle is at a standstill. More specifically, because the moving force applied to the vehicle is determined based on the inclination angle of the road, it is preferable to detect the inclination angle of the road based on the inclination angle of the vehicle and the attitude of the vehicle body. However, because the vehicle body is usually in parallel to the road surface, the inclination angle of the vehicle in the longitudinal direction is used. As shown in FIG. 8C, the relationship among the inclination angle θ of the vehicle, the mass M (kg) of the vehicle, the force F (N) that is applied to the vehicle along the slope, the gravitational acceleration g (m/s²), and the longitudinal acceleration G (m/s²) is expressed by the equations, F=M×g×sin θ, and G=g×sin θ.

Figure 17:
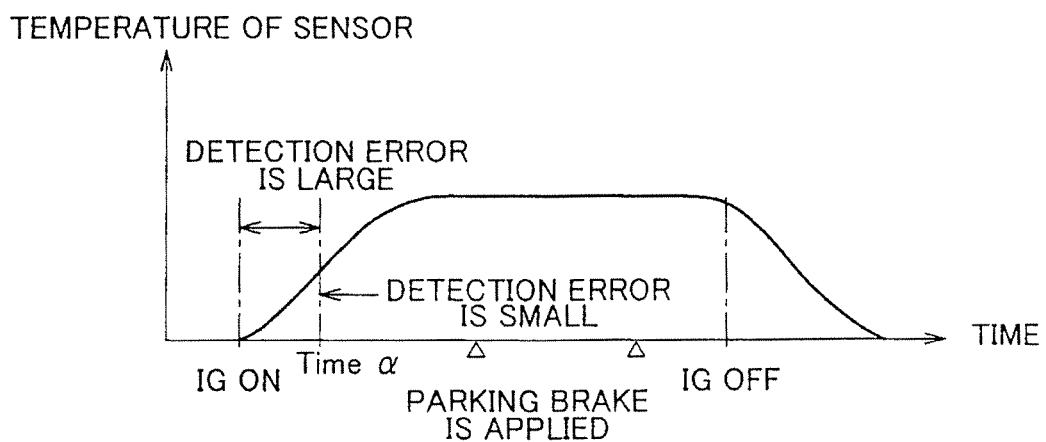
FIG. 17 is a graph showing a change in the temperature of the longitudinal acceleration sensor in the electric parking brake system.

The temperature sensor 224 detects the temperature of the longitudinal acceleration sensor 226. As described above, the longitudinal acceleration sensor 226 is provided on the floor tunnel. Accordingly, the temperature sensor 224 is also provided on the metal plate on which the longitudinal acceleration sensor 226 is provided, at a position near the longitudinal acceleration sensor 226. Accordingly, the temperature detected by the temperature sensor 224 may be regarded as being equal to the temperature of the longitudinal acceleration sensor 226. As described above, the longitudinal acceleration sensor 226 is provided on the floor tunnel. Accordingly, when the ignition switch 225 is turned on and the engine is started, the longitudinal acceleration sensor 226 is warmed up by the heat released from the engine. The temperature of the longitudinal acceleration sensor 226 is higher when the operating time of the engine is long than when the operating time of the engine is short. When the vehicle is left outside, the temperature of the longitudinal acceleration sensor 226 may be regarded as being equal to the outside temperature. When the outside temperature is higher than the reference temperature Tα, the temperature of the longitudinal acceleration sensor 226 is also higher than the reference temperature Tα. When the outside temperature is lower than the reference temperature Tα, the temperature of the longitudinal acceleration sensor 226 is also lower than the reference temperature Tα. However, as shown in FIG. 17, when a predetermined time α has elapsed since the ignition switch is turned on (the engine is started), the temperature of the longitudinal acceleration sensor 226 reaches the reference temperature Tα. After that, the temperature of the longitudinal acceleration sensor 226 is maintained equal to or higher than the reference temperature Tα without decreasing by a large amount. This has been confirmed through experiments, etc. The experiments are carried out when the outside temperature is considerably low. The predetermined time α is set such that, when the predetermined time α has elapsed since the ignition switch 225 is turned on, the temperature of the longitudinal acceleration sensor 226 reliably becomes higher than the reference temperature Tα. The temperature in the passenger compartment also exerts an influence on the longitudinal acceleration sensor 226. If the outside temperature is considerably low when the ignition switch 225 is turned on, the longitudinal acceleration sensor 226 is warmed up also by the heat in the passenger compartment.

In the embodiment of the invention, the absolute value Δ of an error in the value detected by the longitudinal acceleration sensor 226 is determined based on the temperature T detected by the temperature sensor 224 and the temperature characteristics shown in FIG. 8B. The value obtained by adding the absolute value Δ of an error to the detection value Gout (Gout+Δ) is used as the acceleration G derived with the variation based on the temperature characteristics taken into account (hereinafter, referred to as the "acceleration derived with the temperature of the longitudinal acceleration sensor 226 taken into account"), and the inclination angle θ of the vehicle is determined based on the acceleration G derived with the temperature of the longitudinal acceleration sensor 226 taken into account.

$$G=G\text{out}+\Delta G = g \times \sin\theta$$

When the longitudinal acceleration sensor 226 is provided with a temperature sensor, the temperature sensor may be used. As the temperature sensor, at least one of a temperature sensor that detects the outside temperature, a temperature sensor that detects the temperature in the passenger compartment, and a temperature sensor that detects the engine coolant temperature may be used. When at least one of the temperature sensor that detects the outside temperature, the temperature sensor that detects the temperature in the passenger compartment, and the temperature sensor that detects the engine coolant temperature is used, the temperature of the longitudinal acceleration sensor 226 is estimated based on the relationship between the temperature detected by the temperature sensor and the temperature of the longitudinal acceleration sensor 226, and the detected temperature. For example, the sensor that detects the outside temperature is provided at the front of a radiator, and the sensor that detects the temperature in the passenger compartment is provided on an instrument panel. When, for example, a sensor that detects the temperature of the supply air, or a sensor that detects the temperature in the passenger compartment is provided to an air-conditioner, such sensor may be used.

Next, the operation of the thus structured electric parking brake system will be described below. When the application command operation is performed by the parking switch 210, the electric motor 10 is operated, and the cables 22 and 24 are pulled, whereby the drum brakes 18 and 20 are applied. When the release command operation is performed by the parking switch 210, the electric motor 10 is rotated in the reverse direction, and the cables 22 and 24 are slackened. In each of the parking brakes 18 and 20, the brake shoes 110a and 110b are caused to approach each other by the return spring 115, whereby the brake is released. Even if a supply of electric current to the electric motor 10 is stopped when the parking brakes 18 and 20 are on, the friction member pushing force is maintained by the clutch 42.

Figure 9:
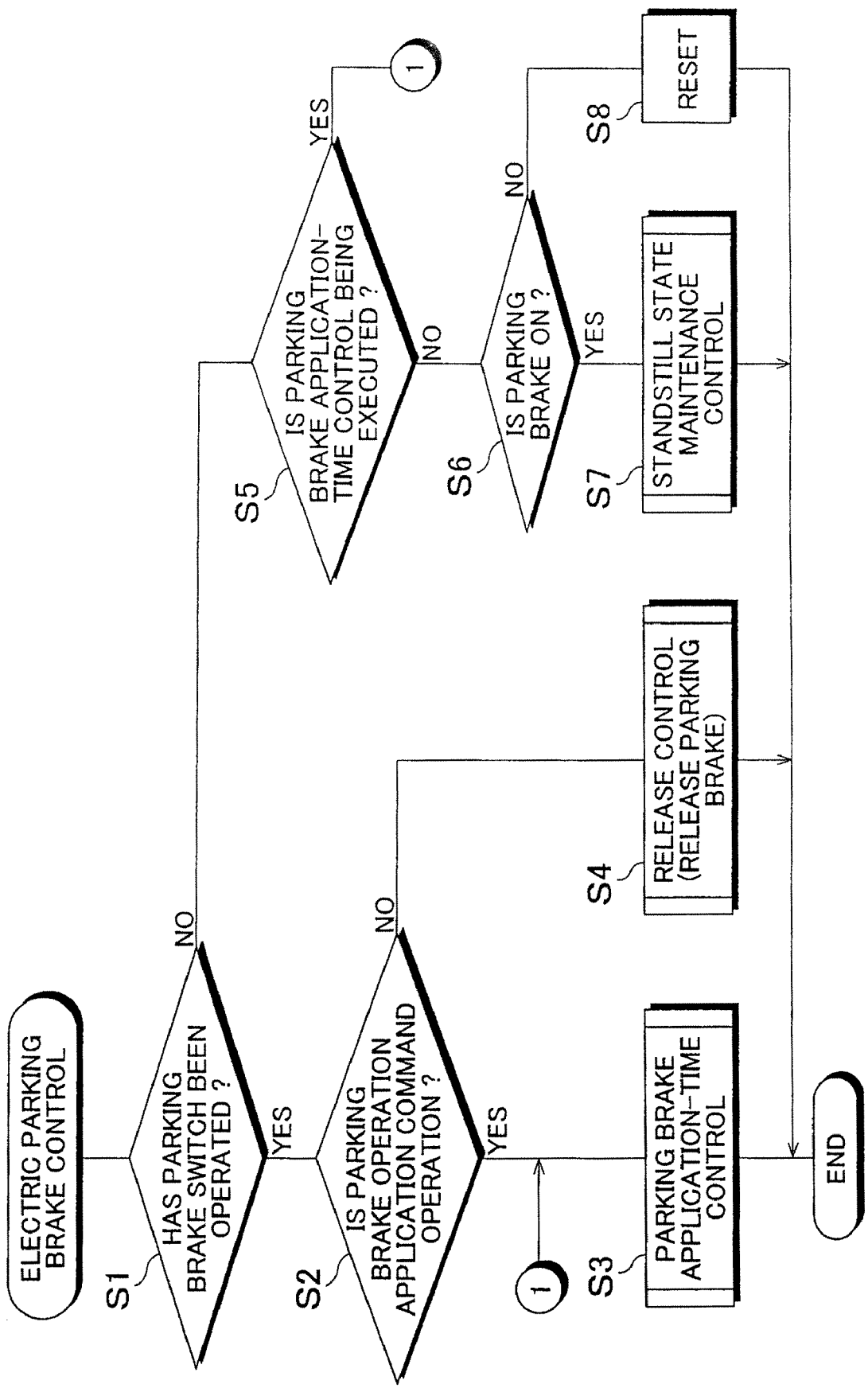
FIG. 9 is a flowchart showing an electric parking brake control program that is stored in a storage unit of an electric parking brake ECU of the electric parking brake system.

Although the parking switch 210 is sometimes operated while the vehicle is running, the case where the parking switch 210 is operated when the vehicle is at a standstill will be described below. The electric parking brake control program shown in the flowchart in FIG. 9 is executed when the ignition switch 225 is on and the vehicle is at a standstill. Because the operation after the ignition switch 225 is turned off has no relation with the invention, the description thereof will not be provided below. The electric parking brake control program is executed at predetermined time intervals. In step 1 (hereinafter, simply referred to as S1. The same applies to the other steps) in FIG. 9, it is determined whether the parking switch 210 has been operated. When it is determined that the parking switch 210 has been operated, it is determined in step S2 whether the operation is the application command operation (whether a command to apply the brake has been issued). When it is determined that the operation is the application command operation, the parking brakes 18 and 20 are applied by the electric motor 10 in S3. This control will be referred to as the parking brake application-time control. On the other hand, when the operation is the release command operation, namely, a command to release the brake has been issued, a negative determination is made in S2, and control to release the brake is executed in S4. In the embodiment of the invention, the electric motor 10 is rotated in the direction opposite to the direction in which the electric motor 10 is rotated to apply the brake, whereby the cables 22 and 24 are slackened.

When it is determined that the parking switch 210 has not been operated, it is determined in S5 whether the parking brake application-time control is being executed. When the parking switch 210 has not been operated and the parking brake application-time control is being executed, an affirmative determination is made in S5, and the parking brake application-time control is continued in S3. When it is determined that the parking brake application-time control is not being executed, it is determined in S6 whether the parking brakes 18 and 20 are on. When it is determined that the parking brakes 18 and 20 are on, the standstill state maintenance control is executed in S7. Namely, the tension of the cables 22 and 24 is controlled such that the braking torque is controlled to a value at which the vehicle is maintained at a standstill. The tension of the cables 22 and 24 is increased if necessary. Sometimes, the standstill state maintenance control and the parking brake application-time control will be collectively referred to as the brake application control. In the embodiment of the invention, the braking torque produced by the parking brakes 18 and 20 is controlled by controlling the tension of the cables 22 and 24. The target tension is determined based on the relationship between the braking torque and the tension, and the target braking torque, and the electric motor 10 is controlled such that the tension detected by the tension sensor 90 approaches the target tension. When the parking switch 21 has not been operated and neither the parking brake application-time control nor the standstill state maintenance control is being executed, the flags, the counters, the parameters, etc. used in the program are reset in S8.

Figure 10:
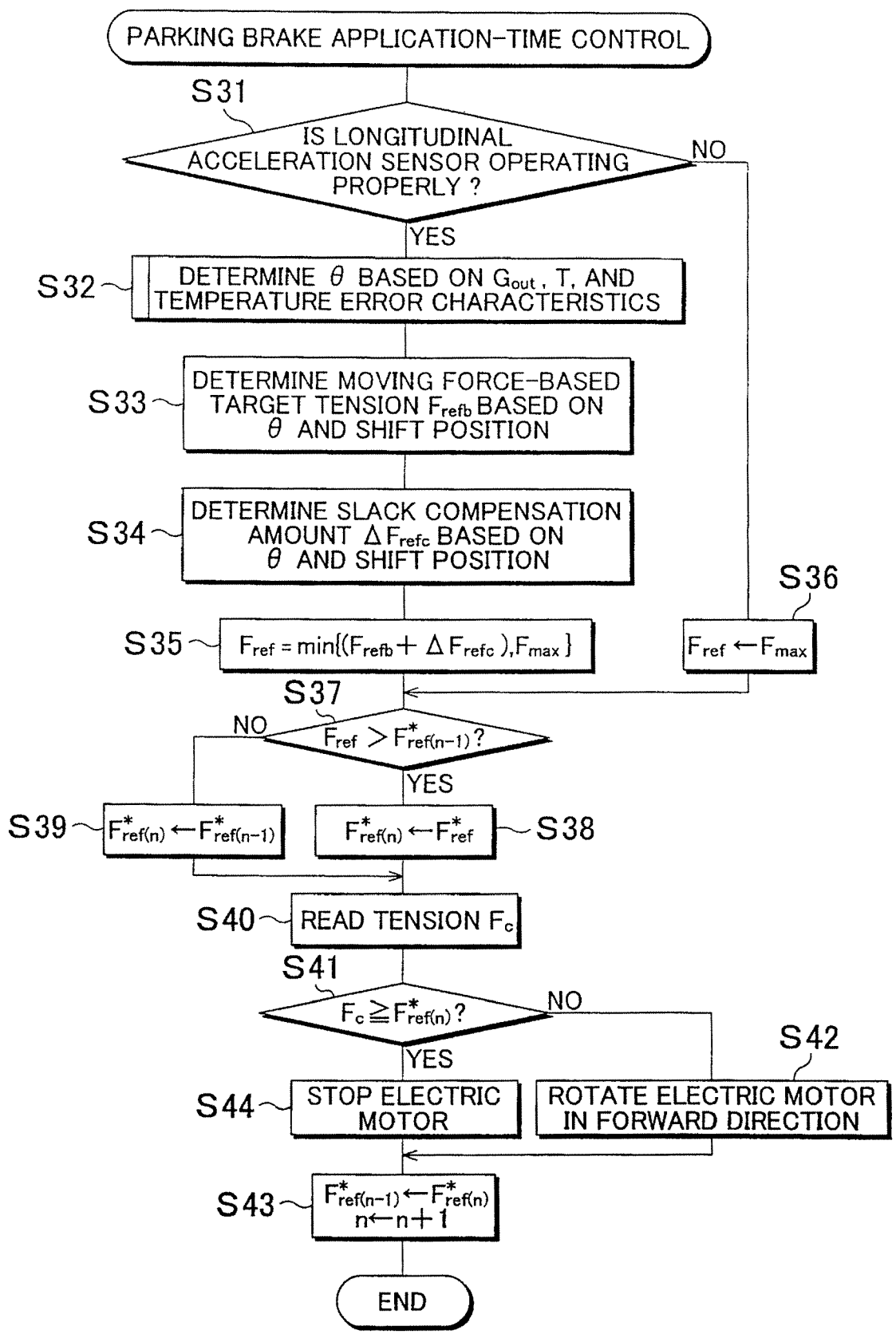
FIG. 10 is a flowchart showing a part (the parking brake application-time control) of the electric parking brake control program.

The parking brake application-time control in S3 is executed according to the flowchart in FIG. 10. When the parking brakes 18 and 20 are applied, the target tension Fref (corresponding to the target braking torque) is basically set to the sum (Fref=Frefb+ΔFrefc) of the moving force-based target tension (the stop command tension, standstill state maintenance tension) Frefb and the slack compensation amount ΔFrefc. As described above, the moving force-based target tension Frefb is the tension required to maintain the vehicle at a standstill against the moving force applied to the vehicle, and set based on the table in FIG. 14. The moving force-based target tension Frefb is determined based on the inclination angle of the vehicle and the shift position. When the vehicle is at a standstill on a downhill slope and the shift position is in Drive, a downward moving force (drive power) is applied to the vehicle by the drive unit. Accordingly, as shown by the dashed line in FIG. 14, the moving force-based target tension Frefb is increased by the amount corresponding to the moving force. When the vehicle is at a standstill on an uphill slope and the shift position is in Reverse, a downward moving force is applied to the vehicle. Accordingly, as shown by the dashed-dotted line in FIG. 14, the moving force-based target tension Frefb is increased by the amount corresponding to the moving force. According to the embodiment of the invention described so far, when a downward drive power is applied to the vehicle by the drive unit, the moving force-based target tension Frefb is increased. In addition, the upper limit is set for the moving force-based target tension Frefb such that the moving force-based target tension Frefb does not exceed the upper limit. As described above, when the parking brakes 18 and 20 are on, if the torque applied to the drum 104 changes due to, for example, a release of the service brake 99, or a change in the shift position, the cables 22 and 24 slack and the braking torque is reduced. The slack compensation amount ΔFrefc is the amount of additional tension used to compensate for a reduction in the braking torque. The slack compensation amount ΔFrefc is set based on the table in FIG. 15. The slack compensation amount ΔFrefc is determined based on the inclination angle of the vehicle and the shift position. If the longitudinal acceleration sensor 226 malfunctions and therefore the inclination angle θ of the vehicle is not detected accurately, the target tension is set to the maximum value of the tension that can be output in an electric parking brake mechanism 30.

Figure 11:
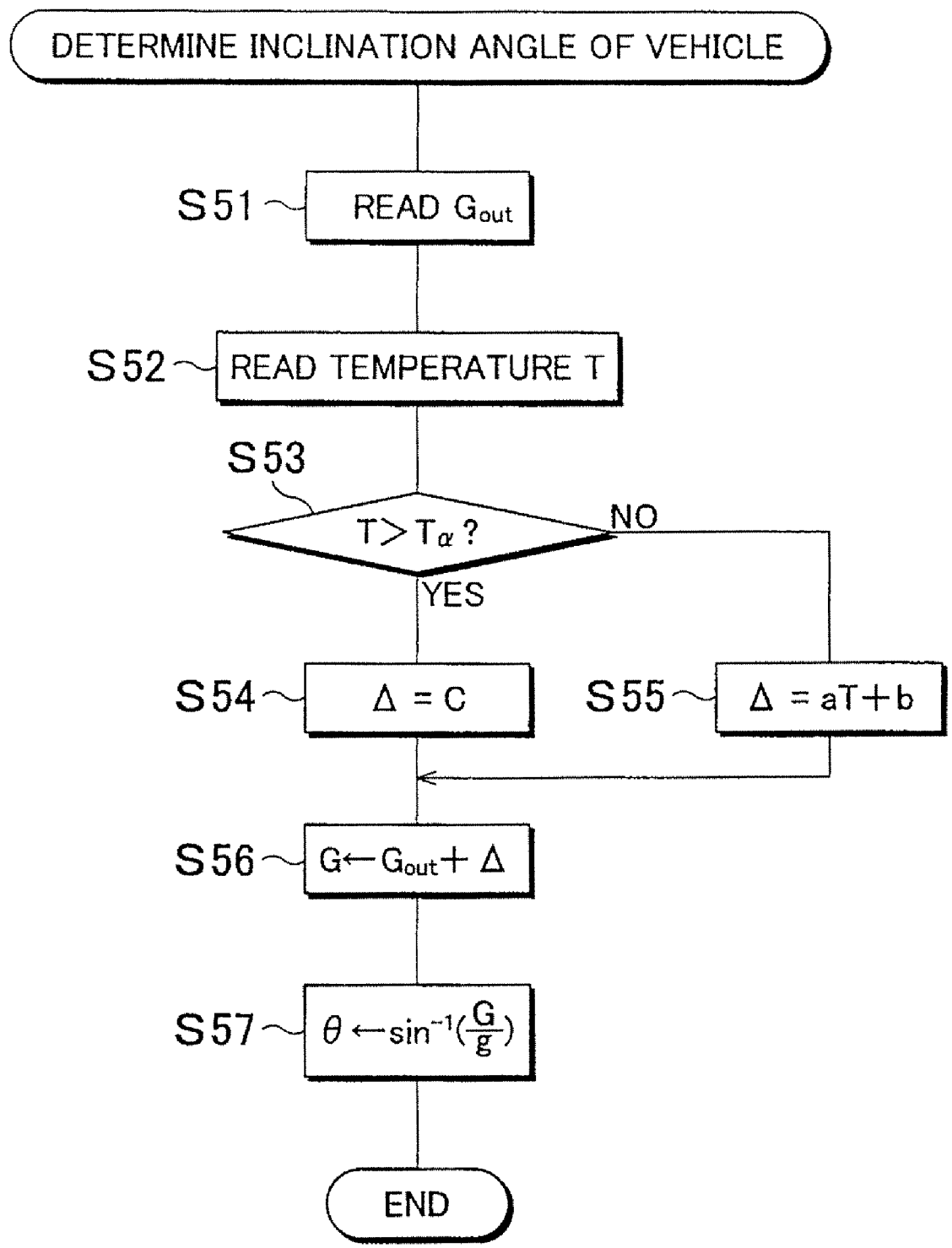
FIG. 11 is a flowchart showing a part (the inclination angle determination) of the parking brake application-time control program.

In S31 in FIG. 10, it is determined whether the longitudinal acceleration sensor 226 is operating properly. When it is determined that the longitudinal acceleration sensor 226 is operating properly, the inclination angle θ of the vehicle is determined based on the detection value (the sensor value) Gout from the longitudinal acceleration sensor 226, the detection value T from the temperature sensor 224 and the temperature error characteristics of the longitudinal acceleration sensor 226 shown in FIG. 8B. As shown in the flowchart in FIG. 11, the sensor value Gout is read in S51, the detection value T from the temperature sensor 224 is read in S52, and whether the temperature of the longitudinal acceleration sensor 226 is higher than the reference temperature Tα is determined in S53. When it is determined in S53 that the temperature of the longitudinal acceleration sensor 226 is higher than the reference temperature Tα, the absolute value Δ of an error is set to c in S54 according to Equation 1. When it is determined in S53 that the temperature of the longitudinal acceleration sensor 226 is equal to or lower than the reference temperature Tα, the absolute value Δ of an error is determined in S55 according to Equation 2 (aT+b). Then, the longitudinal acceleration derived with the temperature of the longitudinal acceleration sensor 226 taken into account is set to the value obtained by adding the absolute value Δ of an error to the sensor value Gout (G←Gout→Δ). In S57, the inclination angle θ of the vehicle is determined based on the longitudinal acceleration G derived with the temperature of the longitudinal acceleration sensor 226 taken into account (θ=sin$^{-1}$ (G/g)). In S33 in FIG. 10, the moving force-based target tension Frefb is determined based on the thus determined inclination angle θ of the vehicle and the table indicated by the map in FIG. 14. In this case, the shift position is also taken into account. In S34, the slack compensation amount ΔFrefc is determined based on the shift position, the inclination angle θ of the vehicle, and the table indicated by the map in FIG. 15. In S35, the target tension Fref in the current routine is determined. According to the embodiment of the invention, the target tension Fref is set to the smaller value from among the sum (hereinafter, referred to as the "slack-based target tension Frefa") of the moving force-based target tension Frefb and the slack compensation amount ΔFrefc, and the maximum value Fmax of the tension that can be output in the electric parking brake mechanism 30 (Fref=MIN {(Frefb+ΔFrefc),Fmax}. In most cases, because the slack-based target tension Frefa (=Frefb+ΔFrefc) is smaller than the maximum value Fmax, the slack-based target tension Frefa is used as the target tension Fref in the current routine. The target tension Fref is used as the tentative target tension.

Figure 16:
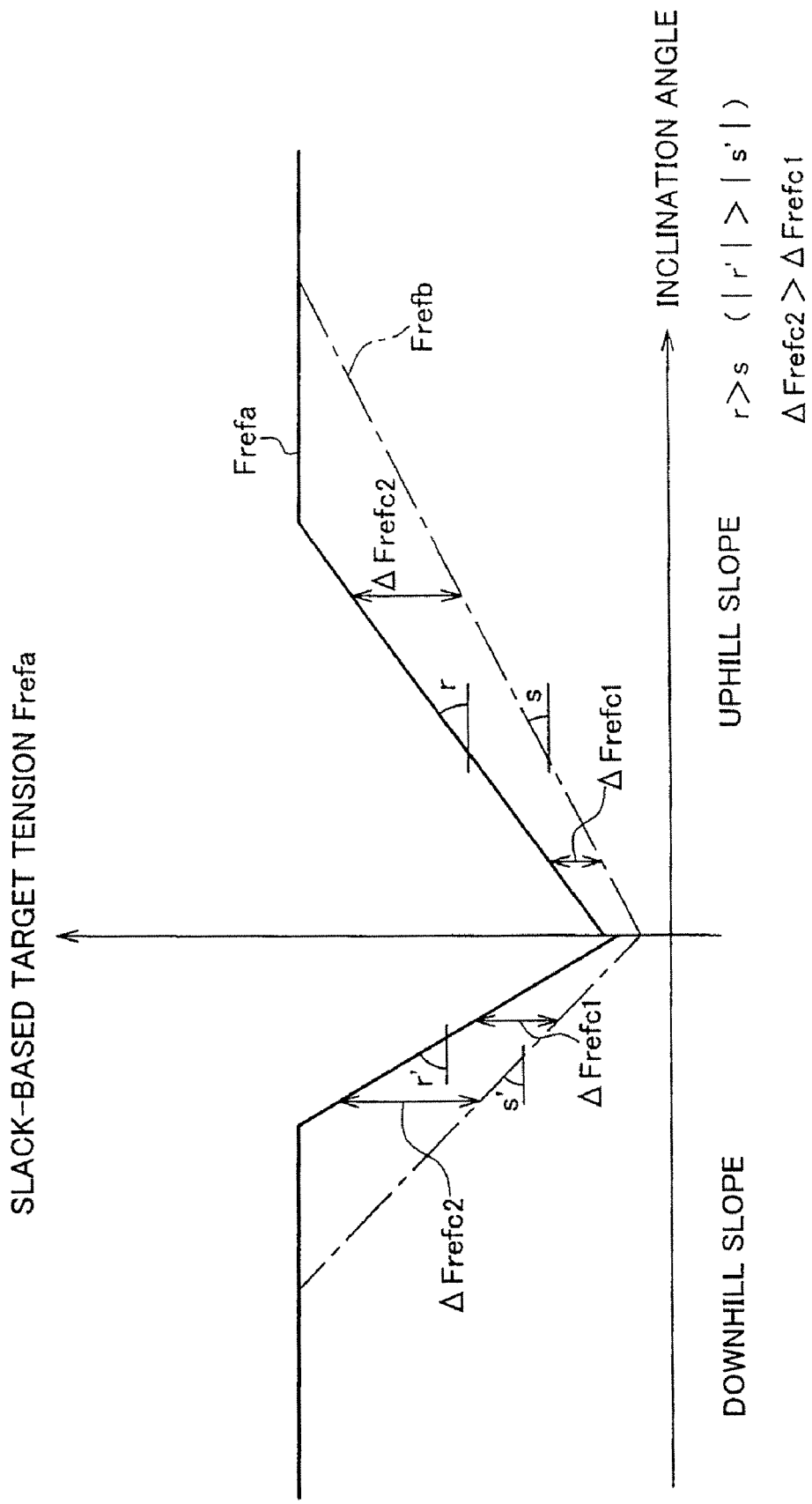
FIG. 16 is a graph showing the target tension determined by executing the electric parking brake control program.

The slack-based target tension Frefa when the shift position is in Neutral is approximately 1.3 to 1.0 times as large as the moving force-based target tension Frefb, as shown in FIG. 16. In other words, the ratio of the slack compensation amount ΔFrefc to the moving force-based target tension Frefb (ΔFrefc/Frefb) is 0.3 to 0.9. Also, as shown in FIG. 16, in the case of an uphill slope, the inclination r of the line indicating the relationship between the slack-based target tension Frefa and the inclination angle θ of the vehicle is larger than the inclination s of the line indicating the relationship between the moving force-based target tension Frefb and the inclination angle θ of the vehicle (r>s). In the case of a downhill slope, the absolute value |r'| of the inclination r' of the line indicating the relationship between the slack-based target tension Frefa and the inclination angle θ of the vehicle is larger than the absolute value |s'| of the inclination s' of the line indicating the relationship between the moving force-based target tension Frefb and the inclination angle θ of the vehicle (|r'|>|s'|). This is because the slack compensation amount ΔFrefc increases as the absolute value of the inclination angle θ of the vehicle increases, as shown in FIG. 15 (ΔFrefc2>ΔFrefc1: the absolute value of the inclination angle θ of the vehicle corresponding to the slack compensation amount ΔFrefc2 is larger than the absolute value of the inclination angle θ of the vehicle corresponding to the slack compensation amount ΔFrefc1). In contrast, when the longitudinal acceleration sensor 226 malfunctions, in S36 in FIG. 10, the tentative target tension Fref in the current routine is set to the maximum value Fmax of the tension that can be output in the electric parking brake mechanism 30 (Fref=Fmax).

Next, in S37 in FIG. 10, the tentative target tension Fref in the current routine is compared with the control target tension (the final target tension, which is used in the control, and which corresponds to the actual target tension. In the embodiment of the invention, the actual target tension is referred to as the "control target tension") in the immediately preceding routine Fref (n−1)*. When the tentative target tension Fref in the current routine is larger than the control target tension in the immediately preceding routine, the control target tension Fref(n)* in the current routine is set to the tentative target tension Fref in the current routine in S38 (Fref(n)*←Fref). On the other hand, when the tentative target tension Fref in the current routine is equal to or smaller than the control target tension Fref(n−1)* in the immediately preceding routine, the control target tension Fref(n)* in the current routine is set to the control target tension Fref(n−1)* in the immediately preceding routine (Fref(n)*←Fref(n−1)*). In other words, the control target tension in the current routine is set to the larger value from among the tentative target tension Fref in the current routine and the control target tension Fref(n−1)* in the immediately preceding routine (Fref(n)*=MAX {Fref, Fref(n−1)*}). When S37 is executed for the first time, n is 1 (n=1). Accordingly, n−1 is 0 (n−1=0), and the initial value of the control target tension Fref(0)* is 0. In S8, the initial value Fref(0)* of the control target tension is set to 0, and the initial value of n is set to 1. As a result, when n is 1 (n=1), the control target tension Fref(1)* in the current routine is set to the tentative target tension Fref in the current routine. As described above, when the parking brakes 18 and 20 are applied, the control target tension Fref(n)* may be increased, but is not decreased. The control target tension Fref(n)* in the current routine is set to the maximum value from among the tentative target tensions Fref in the previous routines. That is, the maximum value hold control is executed. During the parking brake application-time control, the control target tension Fref(n−1)* in the immediately preceding routine is equal to the tentative target tension Fref in the current routine in most cases, and the control target tension Fref(n)* does not changes in many cases. However, for example, when it is determined, during the parking brake application-time control, that the longitudinal acceleration sensor 226 malfunctions, the control target tension Fref(n)* is increased and set to the maximum value Fmax of the tension that can be output in the electric parking brake mechanism 30.

Then, the tension of the cables 22 and 24 is controlled by controlling the electric motor 10. In S40 in FIG. 10, the sensor value Fc detected by the tension sensor 90 is read. In S41, it is determined whether the sensor value Fc is equal to or larger the control target tension Fref(n)*. More specifically, it is determined whether the sensor value Fc is equal to or larger than the control ending threshold value that is set based on the control target tension Fref(n)* and the dead band. The control ending threshold value is equal to the control target tension Fref(n)* in some cases. When the sensor value Fc is smaller than the control target tension Fref(n)* and a negative determination is made in S41, the electric motor 10 is rotated in the forward direction. In S43, the control target tension Fref(n)* in the current routine is set to the control target tension Fref(n−1)* in the immediately preceding routine, and n is increased by 1. In S1 in FIG. 9, it is determined whether the parking switch 210 has been operated. When it is determined that the parking switch 210 has not been operated, a negative determination is made in S1, an affirmative determination is made in S5, and S3 (S31 to S43) is executed. S1, S5 and S3 are repeatedly executed. When the sensor value Fc becomes equal to or larger than the control target tension Fref(n)*, an affirmative determination is made in S41 in FIG. 10, and the electric motor 10 is stopped in S44. The feedback control is executed such that the sensor value Fc approaches the control target tension Fref(n)*. In contrast, when the release command operation is performed by the parking switch 210 during the parking brake application-time control, an affirmative determination is made in S1, a negative determination is made in S2, and the brake release control is executed in S4.

According to the embodiment of the invention described above, in the electric parking brake mechanism 30, when the application of the parking brakes 18 and 20 is started, basically, the sum (the slack-based target tension Frefa) of the moving force-based target tension Frefb and the slack compensation amount ΔFrefc is used as the control target tension Fref for the cables 22 and 24. Accordingly, the braking torque is unlikely to be insufficient in the subsequent on-state in which the parking brakes 18 and 20 are on. In addition, the moving force-based target tension Frefb is set based on the characteristics of the drum brakes 18 and 20. The moving force-based target tension Frefb is set to a larger value when the vehicle is at a standstill on a downhill slope than when the vehicle is at a standstill on an uphill slope. In this way, the moving force-based target tension Frefb is set to an appropriate value at which the vehicle is maintained at a standstill on both a downhill slope and an uphill slope. In addition, the variation of the value detected by the longitudinal acceleration sensor 226 is set to an appropriate value based on the temperature and the temperature characteristics of the longitudinal acceleration sensor 226. As a result, more appropriate variation is determined based on the temperature of the longitudinal acceleration sensor 226 and the inclination angle θ of the vehicle is determined based on the more appropriate variation, than when the inclination angle θ of the vehicle is always determined with the maximum variation taken into account. According to the embodiment of the invention, the moving force-based target tension Frefb and the slack compensation amount ΔFrefc are determined based on the inclination angle θ of the vehicle. It is possible to avoid the situation in which the moving force-based target tension Frefb and the slack compensation amount ΔFrefc are unnecessarily large values because the inclination angle θ of the vehicle is set to an unnecessarily large value. Accordingly, it is possible to prevent the power consumption being unnecessarily large. Especially, the parking brakes 18 and 20 are applied after a relatively long time has elapsed since the vehicle starts running in many cases. Accordingly, the temperature of the longitudinal acceleration sensor 226 is usually equal to or higher than the reference temperature Tα. Therefore, when the parking brakes 18 and 20 are applied, the variation Δ is c in many cases. The variation Δ is made smaller in many cases as compared with the case in which the variation Δ is set to the maximum value d independently of the temperature of the longitudinal acceleration sensor 226. Accordingly, the inclination angle θ of the vehicle detected is also a smaller value. As a result, the moving force-based target tension Frefb and the slack compensation amount ΔFrefc are prevented from being unnecessarily large values. Accordingly, the power consumption is greatly reduced.

Figure 20A:
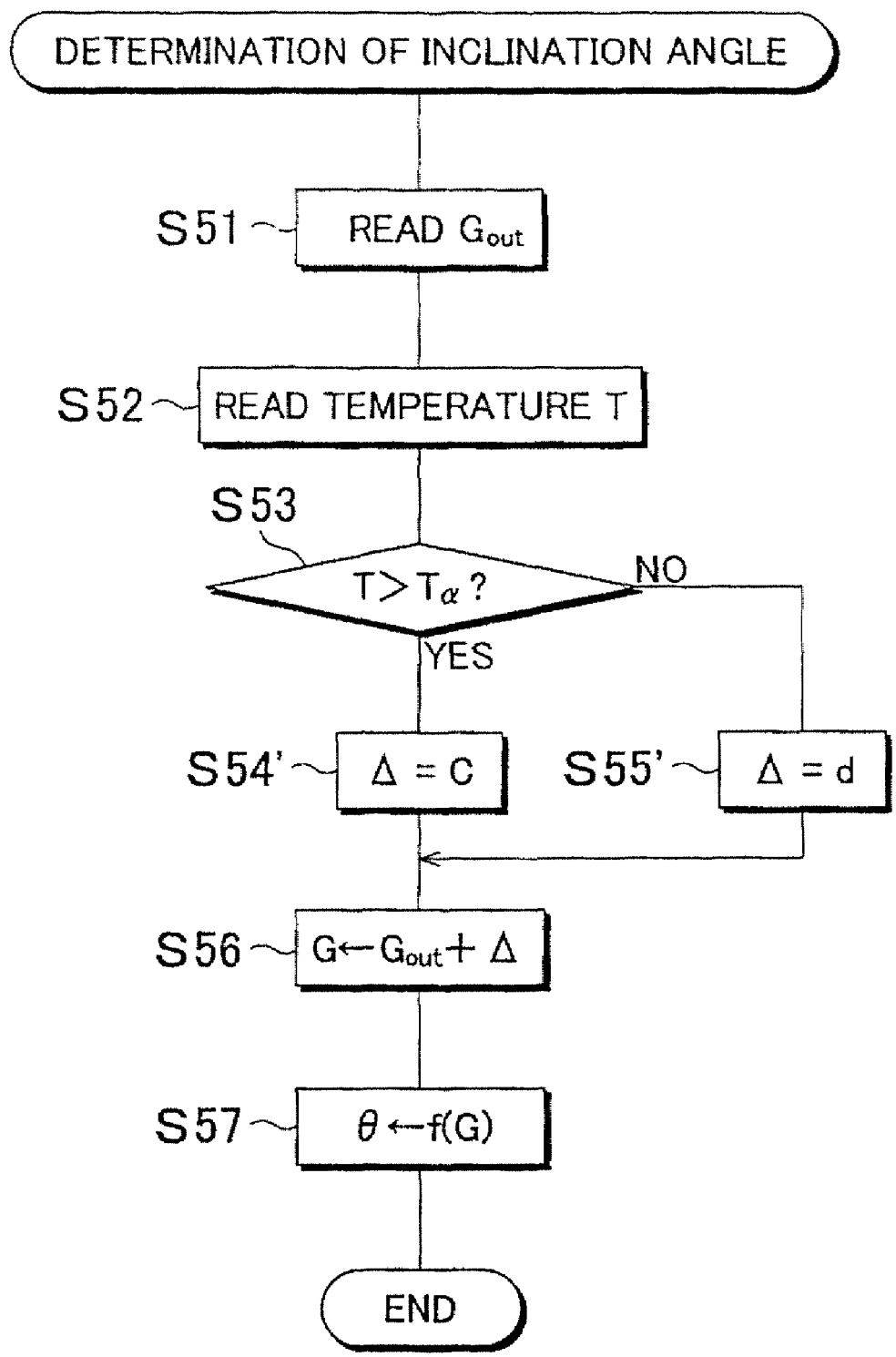
FIG. 20A is another flowchart showing a part (the inclination angle determination) of the parking brake application-time control program.
Figure 20B:
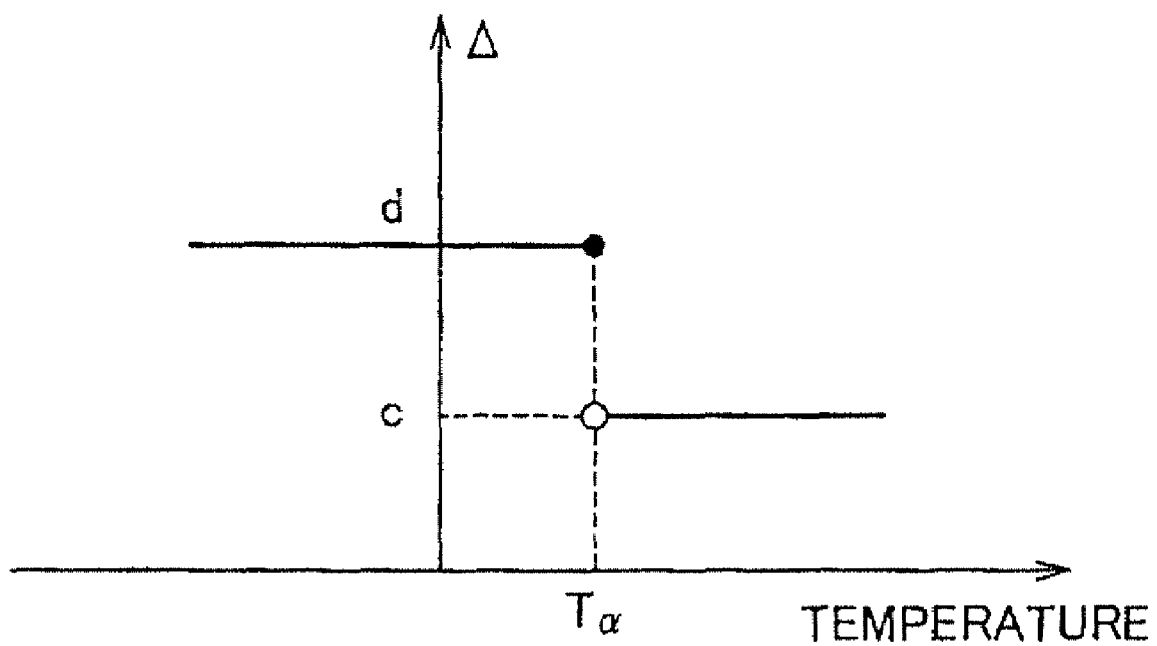
FIG. 20B is a graph indicating that the absolute values of the errors in the values detected by the inclination angle sensor are set to be different across the reference temperature Tα.

According to the embodiment of the invention described above, when the temperature of the longitudinal acceleration sensor 226 is equal to or lower than the reference temperature Tα, the absolute value Δ of an error, which is used when the inclination angle θ of the vehicle is determined, is determined according to the equation, Δ=aT+b. Alternatively, when the temperature of the longitudinal acceleration sensor 226 is equal to or lower than the reference temperature Tα, the absolute value Δ of an error may be set to d. An example of such configuration is shown in FIG. 20B (Δ=d (T≦Tα), Δ=c (T>Tα)). According to this configuration as well, when the temperature of the longitudinal acceleration sensor 226 is higher than the reference temperature Tα, the variation Δ is set to c that is smaller and more appropriate than a conventionally used value. As a result, it is possible to avoid the situation in which the slack-based target tension Frefa becomes an unnecessarily large value and therefore unnecessarily large amount of electric power is consumed. An example of such configuration is shown in the flowchart in FIG. 20A. The longitudinal acceleration Gout is read in S51, the temperature T of the longitudinal acceleration sensor 226 is read in S52, and it is determined in S53 whether the temperature T of the longitudinal acceleration sensor 226 is higher than the reference temperature Tα. When it is determined that the temperature T of the longitudinal acceleration sensor 226 is higher than the reference temperature Tα, the absolute value Δ of an error is set to c in S54'. On the other hand, when the temperature T of the longitudinal acceleration sensor 226 is equal to or lower than the reference temperature Tα, the absolute value Δ is set to d in S55'. Then, in S56 and S57, the inclination angle θ of the vehicle is determined, as in the embodiment of the invention described above. The absolute value Δ of an error is set to one of the two values. As compared with the case where the absolute value Δ of an error is constantly set to d, the absolute value Δ of an error is set to a smaller value when the temperature of the longitudinal acceleration sensor 226 is higher than the reference temperature Tα. As a result, the power consumption is reduced. Setting the absolute value Δ of an error to one of the two values is effectively applied to the case where the temperature sensor 224 is formed of, for example, at least one of the sensor that detects the outside temperature, the temperature that detects the temperature in the passenger compartment, or the sensor that detects the engine coolant temperature, and the temperature of the longitudinal acceleration sensor 226 is estimated based on the value detected by the sensor. When the temperature of the longitudinal acceleration sensor 226 is detected in this way, it is not detected accurately. The absolute value Δ of an error may be set to one of three or more values.

Figure 21:
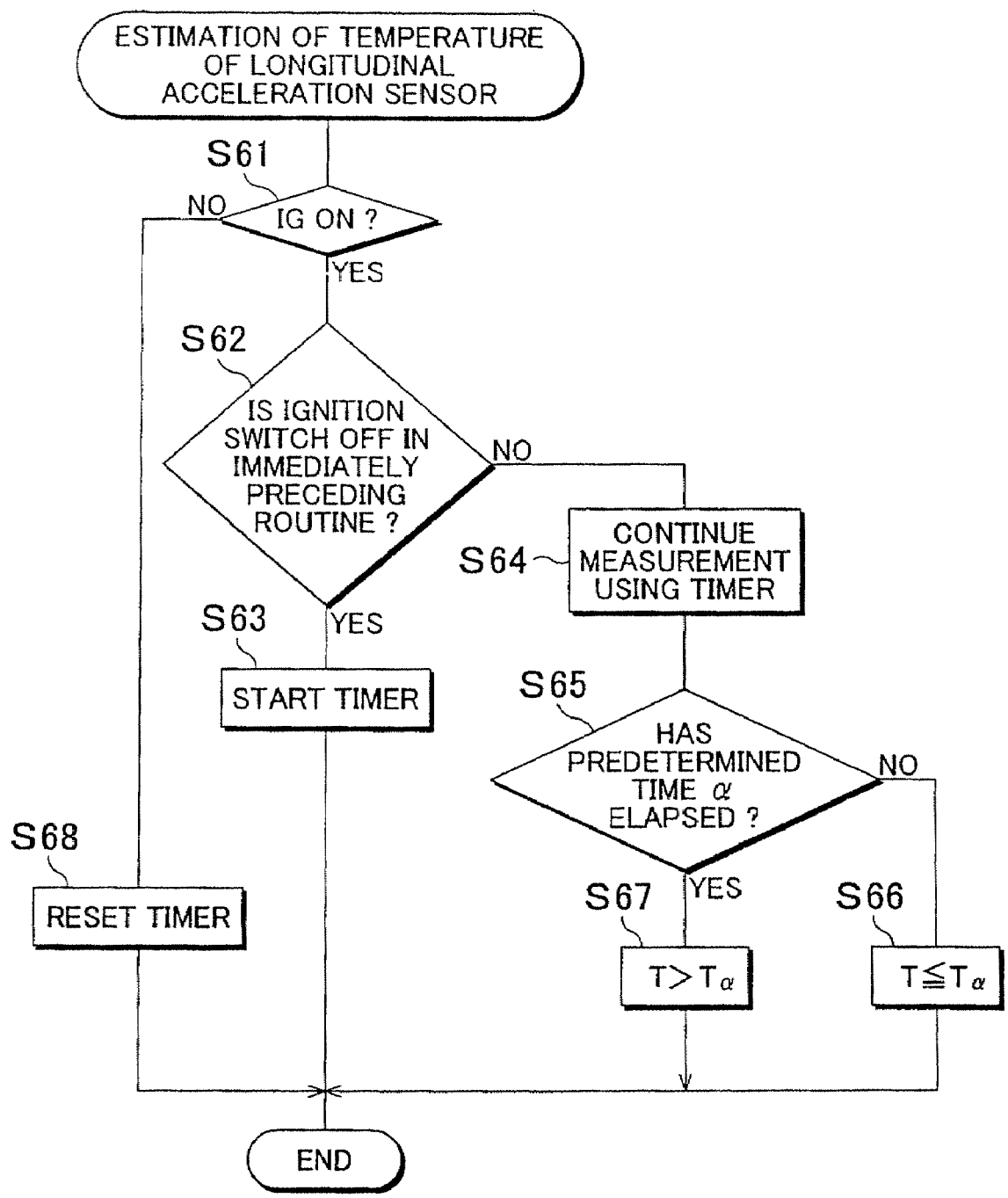
FIG. 21 is a flowchart showing the temperature estimation program stored in the storage unit of the electric parking brake ECU.

The temperature of the longitudinal acceleration sensor 226 may be determined based on the time that has elapsed since the ignition switch 225 is turned on. As described above, as shown in FIG. 17, when the time that has elapsed since the ignition switch 225 is turned on (the operating time of the engine) is equal to or longer than the predetermined time α, it is estimated that the temperature of the longitudinal acceleration sensor is higher than the reference temperature Tα. The temperature estimation program shown in the flowchart in FIG. 21 is executed at predetermined time intervals. In S61, it is determined whether the ignition switch 225 is on. When it is determined that the ignition switch 225 is on, it is determined whether the ignition switch 225 is off in the immediately preceding routine. That is, it is determined whether the ignition switch 225 is turned on in the current routine. When it is determined that the ignition switch 225 is operated and turned on in the current routine, the timer is started in S63. When the program is executed next time, a negative determination is made in S62 because the ignition switch 225 is on in the current routine, and is also on in the immediately preceding routine. In S64, the measurement by the timer is continued (the value counted by the timer is increased). In S65, it is determined whether the elapsed time (the engine operating time) is longer than the predetermined time α. When it is determined that the elapsed time has not reached the predetermined time α, it is determined that the temperature T of the longitudinal acceleration sensor 226 is equal to or lower than the reference temperature Tα. On the other hand, when it is determined that the elapsed time is longer than the predetermined time α, it is determined in S67 that the temperature T of the longitudinal acceleration sensor 226 is higher than the reference temperature Tα. The thus estimated temperature of the longitudinal acceleration sensor 226 is read in S52 in the inclination angle determination routine shown in the flowchart in FIG. 20A, and then used. When the ignition switch 225 is off, the timer is reset in S68. According to the embodiment of the invention described above, the temperature of the longitudinal acceleration sensor 226 is estimated without providing the temperature sensor 224. Thus, the absolute value Δ of an error is determined. According to the embodiment of the invention, in the electric parking brake ECU 200, a unit that stores the inclination angle sensor temperature estimation program shown in the flowchart in FIG. 21, a unit that executes the inclination angle sensor temperature estimation program, etc. constitute a sensor temperature estimation unit.

Figure 22:
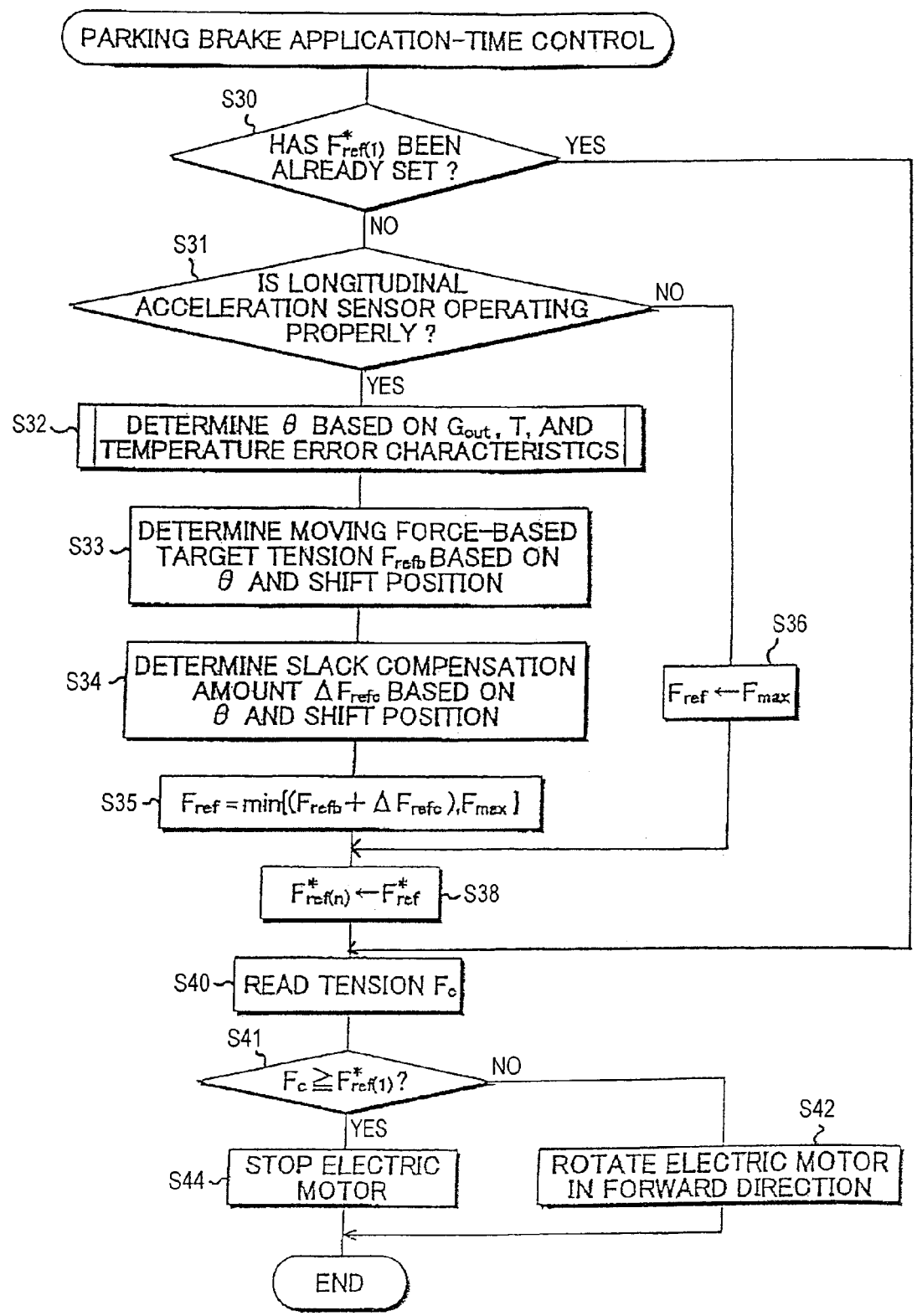
FIG. 22 is another flowchart showing a part (the application-time control) of the electric parking brake control program.

In the embodiment of the invention described above, S37 to S39 may be omitted. This is because, the slack-based target tension Frefa seldom changes during the application-time control over the drum brakes 18 and 20. Also, the control target tension Fref(n)* may be determined only once when the application of the parking brakes 18 and 20 is started, that is, determination of the control target tension Fref(n)* may be omitted during the application of the parking brakes 18 and 20. When the control target tension Fref(1)* is set in the case where the application command operation is performed by the parking switch 210, the electric motor 10 is continuously rotated in the forward direction until the detection value Fc from the tension sensor 90 reaches the control target tension Fref(1)*. An example of such configuration is shown in FIG. 22. According to this configuration, it is determined in S30 whether the control target tension Fref(1)* has already been set. If it is determined that the control target tension Fref(1)* has not been set, S31 to S36 and S38 are executed, as in the embodiment of the invention described above. The control target tension Fref(1)* in the current routine is set to the tentative target tension Fref in the current routine. When it is determined that the control target tension Fref(1)* has already been set, an affirmative determination is made in S30, and S40 and the following steps are executed as in the embodiment of the invention described above. S1, S5, S3 (S30, S40 to 42) are repeatedly executed. When the actual tension Fc reaches the control target tension Fref(1)*, the rotation of the electric motor 10 is stopped in S44.

Figure 12:
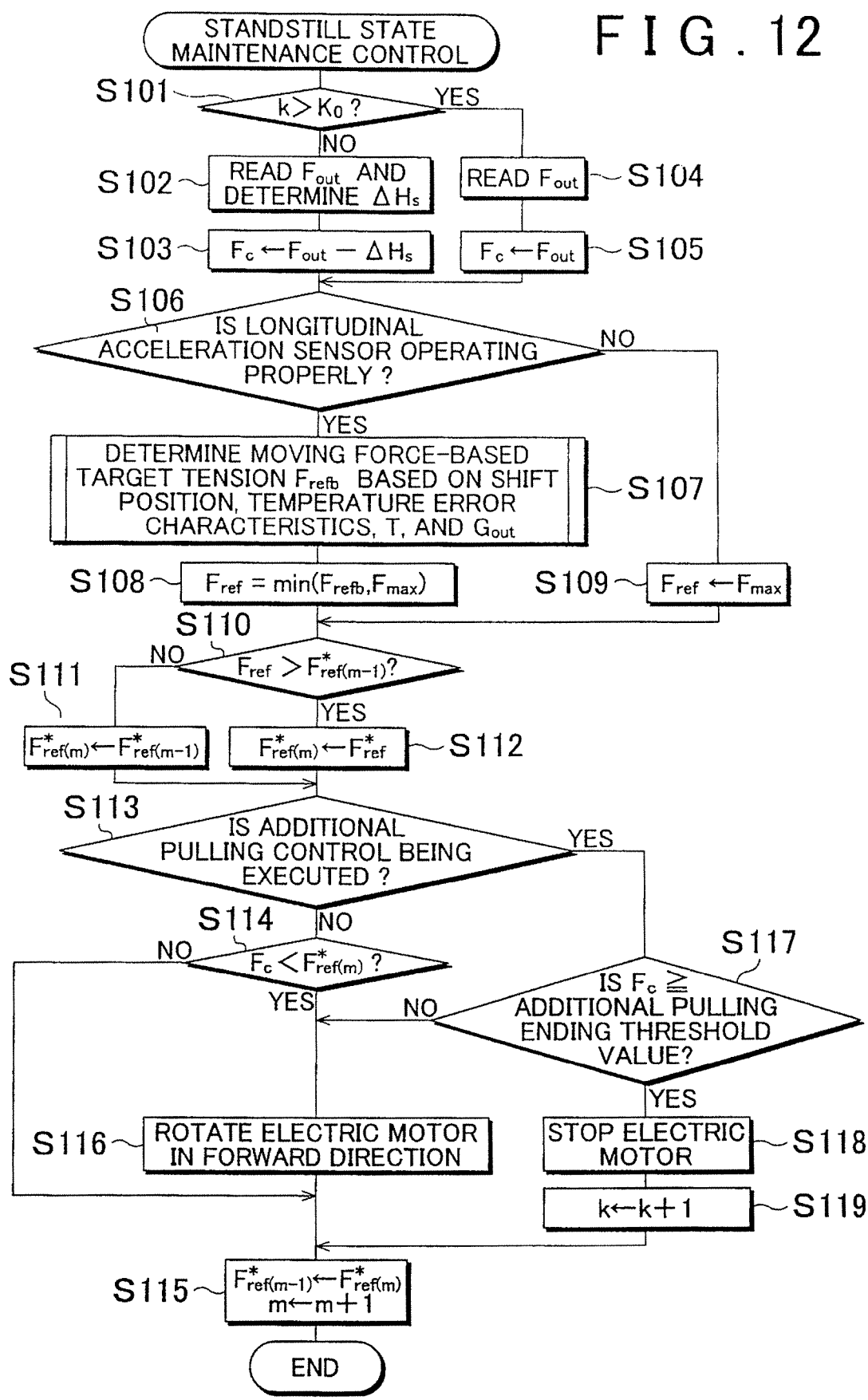
FIG. 12 is a flowchart showing another part (the standstill-state maintenance control) of the electric parking brake control program.

The standstill state maintenance control in S7 in FIG. 9 is executed according to the flowchart in FIG. 12. S7 is executed after the parking brake 18 and 20 are applied in S3 and the electric motor 10 is stopped. In the standstill state maintenance control, the control target tension Fref(m)* is basically set to the moving force-based target tension Frefb, and the tension of the cable 22 and 24 is basically maintained at the moving force-based target tension Frefb. Accordingly, if the tension is lower than the moving force-based target tension Frefb, so-called additional pulling control is executed, namely, the tension of the cables 22 and 24 is increased. In the standstill state maintenance control, the additional pulling control is executed when the tension of the cable is lower than the control target tension Fref(m)*. The tension of the cable may made larger than the control target tension Fref(m)*, but is never reduced. If the vehicle is maintained at a standstill, the necessity to reduce the tension is low. If the electric motor 10 is operated in order to reduce the tension, the power consumption is undesirably increased. In addition, in the standstill state maintenance control, the control target tension Fref (m)* may be increased but is never reduced. If, for example, an occupant gets on or off the vehicle or a baggage is loaded or unloaded when the parking brakes 18 and 20 are on, the attitude of the vehicle body changes, and the inclination angle θ of the vehicle changes. If the service brake 99 is released, a torque is applied to the wheel due to, for example, a distortion of a suspension, and the attitude of the vehicle changes and the inclination angle θ of the vehicle changes. In addition, the inclination angle θ of the vehicle changes due to the variation in the value detected by the longitudinal acceleration sensor 226. Meanwhile, the shift position may be changed among the Neutral, Drive and Reverse. If the inclination angle θ of the vehicle or the shift position changes, the moving force-based target tension Frefb changes. Among these cases, the moving force applied to the vehicle actually changes in some cases, and does not change in the other cases. In both cases, the moving force-based target tension Frefb increases or decreases. When the moving force-based target tension increases, there is a possibility that the moving force applied to the vehicle is actually increased. Preferably, the tension is made close to the moving force-based target tension Frefb. Accordingly, the control target tension Fref(m)* may be increased but is never decreased, that is, the maximum value hold control is executed. In addition, if the tension of the cables 22 and 24 becomes lower than the additional pulling start threshold value that is set based on the control target tension Fref(m)*, the dead band, etc., the electric motor 10 is rotated in the forward direction, and the tension of the cables 22 and 24 is increased. When the tension reaches the additional pulling ending threshold value that is set based on the control target tension Fref(m)*, the dead band, etc., the rotation of the electric motor 10 is stopped. This control is the additional pulling control described above. The additional pulling start threshold value is smaller than the control target tension Fref(m)* by a predetermined value α, and the additional pulling ending threshold value is larger than the control target tension Fref(m)* by a predetermined value β. At least one of the additional pulling start threshold value and the additional pulling ending threshold value may be set to a value equal to the control target tension Fref(m)*. In the following description, the additional pulling start threshold value is set to the control target tension Fref(m)*, and the additional pulling ending threshold value is set the a value larger than the control target tension Fref(m)* by a predetermined value.

The tension sensor 90 has the hysteresis characteristics as described above. Accordingly, the sensor value Fout may deviate from the actual tension Fc. When the tension decreases, the sensor value Fout is larger than the actual tension Fc. Accordingly, even if the actual tension Fc becomes smaller than the control target tension Fref(m)*, this is not detected promptly, which may delay the time at which the additional pulling control is started. To avoid this, the actual tension Fc is determined based on the sensor value Fout and the hysteresis width ΔHs, and the additional pulling control is executed if the actual tension Fc becomes smaller than the control target tension Fref(m)*. In contrast, when the additional pulling control is executed predetermined number of times (for example, twice), the tension of the cables 22 and 24 is increased by a sufficient amount, and the possibility that the additional pulling control needs to be executed again is low. If the hystresis characteristics are taken into account, hunting may be caused. Therefore, according to the embodiment of the invention, after the additional pulling control is executed predetermined number of times, the hysteresis characteristics are not taken into account, and the additional pulling control is executed if the sensor value Fout becomes smaller than the control target tension Fref(m)*.

In S101 in FIG. 12, it is determined whether the number of times the additional pulling control is executed has exceeded the predetermined number of times K0. If it is determined that the number of times the additional pulling control is executed has not exceeded the predetermined number of times K0, the sensor value Fout detected by the tension sensor 90 is read, and the actual tension Fc is determined with the hysteresis width ΔHs taken into account. Because the initial value of the count value k indicated by the counter that counts the number of times the additional pulling control is executed is 0, a negative determination is made in S101 that is executed for the first time. When it is determined that the number of times the additional pulling control is executed is equal to or smaller than the predetermined number of times K0, the sensor value Fout is read and the hysteresis width ΔHs is determined in S102, and the actual tension Fc is determined in S103 (Fc=Fout−hystresis width ΔHs (the difference between detection value Fout and actual tension Fc)). The hysteresis width ΔHs is determined based on the table that indicates the relationship between the sensor value Fout and the hysteresis width ΔHs, and the sensor value Fout. On the other hand, when it is determined that the number of times the additional pulling control is executed has exceeded the predetermined number of times K0, the sensor value Fout is read in S104, and the actual value Fc is set to the sensor value Fout (Fc=Fout) in S104.

Next, it is determined in S106 whether the longitudinal acceleration sensor 226 is operating properly. When it is determined that the longitudinal acceleration sensor 226 is operating properly, the moving force-based target tension Frefb is set in the same manner as that in S32 to S34 in the parking brake application-time control, and the tentative target tension Fref in the current routine is set to the smaller value from among the moving force-based target tension Frefb and the maximum tension Fmax in S108 (Fref=MIN (Frefb, Fmax)). On the other hand, when it is determined that the longitudinal acceleration sensor 226 malfunctions, the tentative target tension Fref in the current routine is set to the maximum tension Fmax in S109 (Fref=Fmax). In S110 to S112, the control target tension Fref(m−1)* in the immediately preceding routine and the tentative target tension Fref in the current routine are compared with each other as in S37 to S39 in the parking brake application-time control, and the control target tension Fref(m)* in the current routine is set to the larger value from among the control target tension Fref(m−1)* in the immediately preceding routine and the tentative target tension Fref in the current routine (Fref(m)*=MAX {Fref,Fref(m−1)*}).

Then, the additional pulling control is executed in S113 and the following steps, if necessary. It is determined in S113 whether the additional pulling control is being executed. When it is determined that the additional pulling control is not being executed, it is determined in S114 whether the actual tension Fc is smaller than the control target tension Fref(m)*. Namely, it is determined whether the additional pulling control start condition is satisfied. When it is determined that the additional pulling control start condition is not satisfied, namely, if the actual tension Fc is equal to or larger than the control target tension Fref(n)*, a negative determination is made. Then in S115, the control target tension Fref(m)* in the current routine is set to the control target tension Fref(m−1)* in the immediately preceding routine, and m is increased by 1. Then, S1 in FIG. 9 is executed again. In S8, the initial value of the control target tension Fref(0)* is set to 0, and the initial value of m is 1. In S1, it is determined whether the parking switch 210 has been operated. When it is determined that the parking switch 210 has not been operated, a negative determination is made in S1. In this case, although the parking brake application-time control is not being executed, the parking brakes 18 and 20 are on. Accordingly, a negative determination is made in S5, and an affirmative determination is made in S6. Then, the standstill state maintenance control is executed in S7. S1, S5, S6, and S7 (S101 to S113, S114, and S115) are repeatedly executed. While the actual tension Fc is equal to or larger than the control target tension Fref(m)* and a negative determination is made in S114, the electric motor 10 is not operated and the tension is continuously maintained by the clutch 42.

When the actual tension Fc becomes smaller than the control target tension Fref(m)* while S1, S5, S6 and S7 are repeatedly executed, an affirmative determination is made in S114 and the electric motor 10 is rotated in the forward direction in S116. The cables 22 and 24 are pulled. When S7 is executed next time, because the additional pulling control is being executed, an affirmative determination is made in S113, and it is determined in S117 whether the actual tension Fc is equal to or larger the additional pulling ending threshold value. Before the actual tension Fc is equal to or larger than the additional pulling ending threshold value, the electric motor 10 is rotated in the forward direction in S116. Before the actual tension Fc becomes equal to or larger than the additional pulling ending threshold value, the electric motor 10 is continuously rotated. However when the actual tension Fc is equal to or larger than the additional pulling ending threshold value, it is determined that the ending condition is satisfied, and an affirmative determination is made in S117. Then, in S118, the electric motor 10 is stopped, and the count value k indicated by the additional pulling number-times counter is increased by 1.

S1, S5, S6 and S7 are repeatedly executed, and the additional pulling control is executed if necessary. When the number of times the additional pulling control is executed is equal to or smaller than the predetermined number of times K0, a negative determination is made in S101. Then, the actual tension Fc is determined with the hysteresis characteristics take into account, and the actual tension Fc is compared with the control target tension Fref(m)*. When the number of times the additional pulling control is executed exceeds the predetermined number of times K0, the hysteresis characteristics are not taken into account. An affirmative determination is made in S101, and the actual tension Fc is set to the sensor value Fout in S104 and S105. Then, the actual tension Fc (Fout) and the control target tension Fref(m)* are compared with each other. During the standstill state maintenance control, the actual tension Fc and the control target tension Fref(m)* are compared with each other in S114, and the actual tension Fc and the additional pulling ending threshold value are compared with each other in S117. However, the control target tension Fref(m)* is not always constant. If the control target tension Fref(m)* changes, the additional pulling ending threshold value also changes. However, the control target tension Fref(m)* may be increased but is never decreased. Accordingly, the additional pulling ending threshold value may be increased but is never decreased. S1, S5, S6 and S7 are repeatedly executed. However, if the release command operation is performed by the parking switch 210, an affirmative determination is made in S1 in FIG. 9, a negative determination is made in S2, and the release control is executed in S4.

Figure 18:
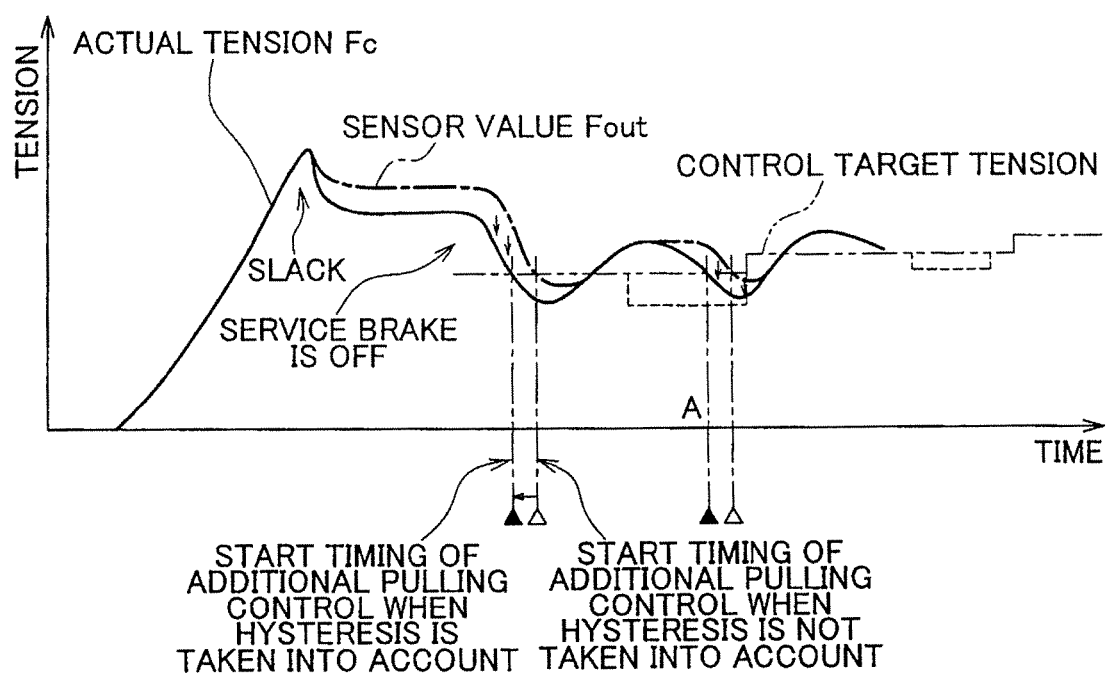
FIG. 18 is a graph showing the manner in which the tension of the cable changes when the electric parking brake control program is executed.

FIG. 18 shows an example of a change in the tension in the electric parking brake system. When the parking brakes 18 and 20 are applied, the tension of the cables 22 and 24 is usually increased to the slack-based target tension Frefa, and the electric motor 10 is stopped. Then, the standstill state maintenance control is executed. After the electric motor 10 is stopped, the tension is reduced by, for example, the electric motor 10, a backlash of the gear train 40, etc. Then, if a torque applied to the drum 104 is constant, the tension is maintained constant. For example, when the service brake 99 is released and a torque is applied to the drum 104, the tension is reduced by the slack in the cables 22 and 24, and therefore the braking torque is reduced. However, in the parking brake application-time control, the tension is increased to the slack-based target tension Frefa. Accordingly, it is possible to avoid the situation where the tension is immediately becomes lower than the moving force-based target tension Frefb due to the slack in the cables 22 and 24, and the timing at which the additional pulling control is started is delayed. In the standstill state maintenance control, the actual tension Fc is determined with the hysteresis characteristics of the tension sensor 90 taken into account, and the actual tension Fc and the control target tension Fref(m)* are compared with each other. As a result, as shown in FIG. 18, the timing at which the additional pulling control is started is advanced as compared with the case where the hysteresis characteristics are not taken into account. It becomes possible to start the additional pulling control at appropriate timing, and the braking torque is controlled to an appropriate value at which the vehicle is maintained at a standstill. In addition, when the number of times the additional pulling control is executed exceeds the predetermined number of times, the hystresis characteristics are not taken into account. Because the tension of the cables 22 and 24 is sufficiently large, the necessity to execute the additional pulling control is low. Also, if the hysteresis characteristics are taken into account, hunting may occur. Accordingly, when the number of times the additional pulling control is executed exceeds the predetermined number of times, the hystresis characteristics are not taken into account. In addition, during the standstill state maintenance control, the maximum value holding control is executed. Even if the tentative target tension Fref is reduced as indicated by the dashed lines in FIG. 18, the control target tension Fref(m)* is not reduced as indicated by the dashed-two dotted line. However, when the target tension is increased, the control target tension Fref(m)* is also increased. Accordingly, if the control target tension Fref(m)* is reduced, the additional pulling control is not executed at time A. However, because the control target tension Fref(m)* is not reduced, the additional pulling control is executed. As a result, it is possible to maintain the braking torque at an appropriate value at which the vehicle is maintained at a standstill.

According to the embodiment of the invention described above, a pushing force control unit is formed of the tension sensor 90, the longitudinal acceleration sensor 226, the temperature sensor 224 that serves as a temperature determination unit, a unit of the electric parking brake ECU 200, which stores the electric parking brake control program shown in the flowchart in FIG. 9, a unit of the electric parking brake ECU 200, which executes the electric parking brake control program, a unit of the electric parking brake ECU 200, which stores the table shown in the map in FIGS. 14 and 15, etc. The pushing force control unit also serves as a tension control unit. In the pushing force control unit, a unit that stores S3 in FIG. 9, a unit that executes S3, etc. constitute an application-time control unit. In the application-time control unit, a unit that stores S34 in FIG. 10, a unit that executes S34, a unit that stores the slack compensation amount setting table shown in FIG. 15, etc. constitute a first slack compensation amount determination unit. The first slack compensation amount determination unit also serves as a torque-based slack compensation amount determination unit, a torque-direction-based slack compensation amount determination unit, a moving force-based slack compensation amount determination unit, a second slack compensation amount determination unit, an inclination-direction-based slack compensation amount determination unit, and an inclination amount-based slack compensation amount determination unit. In addition, in the pushing force control unit, a unit that stores S33 and S40 to S44 in FIG. 10, a unit that executes S33 and S40 to S44, a unit that stores the moving force-based target tension setting table in FIG. 14, etc. constitute an inclination-based tension control unit. In the inclination-based tension control unit, a unit that stores S33, a unit that executes S33, a unit that stores the table in FIG. 14, etc. constitute an inclination-based target value setting unit. In the pushing force control unit, a unit that stores S33 to S35 and S40 to S44 in FIG. 10, a unit that executes S33 to S35 and S40 to S44, a unit that stores the tables in FIGS. 14 and 15, etc. constitute a slack-based tension control unit. In addition, in the pushing force control unit, a unit that stores S32 and S33, a unit that executes S32 and S33, etc. constitute a temperature-dependent target value setting unit. In the temperature-dependent target value setting unit, a unit that stores S53 to S55 in FIG. 11, a unit that executes S53 to S55, etc. constitute an error determination unit, and a unit that stores S33, a unit that executes S33, etc. constitute an error-based target value setting unit.

In the electric parking brake ECU 200, a unit that stores S7 in FIG. 9, a unit that execute S7, etc. constitute a standstill state maintenance control unit. In the electric parking brake ECU 200, a unit that stores S101 to S105 and S113 to S119 in the flowchart in FIG. 12, a unit that executes S101 to S105 and S113 to S119, the tension sensor 90, etc. constitute a hysteresis-based control unit. The hysteresis-based control unit serves as a first hysteresis-based control unit. In the first hysteresis-based control unit, a unit that stores S102 and S103, a unit that executes S102 and S103, the tension sensor 90, etc. constitute an actual tension determination unit. In addition, a unit that stores S101 to S103 and S113 to S119 in FIG. 12, a unit that executes S101 to S103 and S113 to S119, etc. constitute a first early-stage tension control unit, and a unit that stores S101, S104, S105 and S113 to S119, a unit that executes S101, S104, S105 and S113 to S119, etc. constitute a first late-stage tension control unit. In the electric parking brake system 200, a unit that stores S106 to S109 in FIG. 12, a unit that executes S106 to S109, etc. constitute a tentative target value setting unit, and a unit that stores S110 to S112, a unit that executes S110 to S112, etc. constitute a final target value setting unit. The tentative target value setting unit also serves as an inclination angle-based target value setting unit. In addition, in the inclination angle-based target value setting unit, a unit that stores S106 and S109, a unit that executes S106 and S109, etc. constitute a malfunction-time setting unit.

In the embodiment of the invention described above, the actual tension Fc is determined based on the hysteresis width ΔHs. Alternatively, the hysteresis-based target tension Fref may be determined based on the hysteresis width ΔHs (Fref'=Fref+ΔHs). An example of such configuration is shown in the flowchart in FIG. 23. In S150, the sensor value Fout detected by the tension sensor 90 is read, and the actual tension value Fc is set to the sensor value Fout (Fc←Fout). The hysteresis width ΔHs is determined based on the sensor value Fout. As in the embodiment of the invention described above, in S106, it is determined whether the longitudinal acceleration sensor 226 is operating properly. When it is determined that the longitudinal acceleration sensor 226 is operating properly, the moving force-based target tension Frefb is determined in S107. It is then determined in S151 whether the number of times the additional pulling control is executed has exceeded the predetermined number of times K0. When it is determined that the number of times the additional pulling control is executed is equal to or smaller than the predetermined number of times K0, The hysteresis-based moving force-based target tension is set to the value obtained by adding the hysteresis width ΔHs to the moving force-based target tension Frefb (Frefb=Frefb+ΔHs) in S152. In S153, the tentative target tension Fref in the current routine is set to the smaller value from among the maximum tension Fmax and the hysteresis-based moving force-based target tension Frefb. In most cases, the tentative target tension Fref is set to the hysteresis-based moving force-based target tension Frefb. As in the embodiment of the invention described above, in S110 to S112, the control target tension Fref(m)* in the immediately preceding routine and the tentative target tension Fref in the current routine are compared with each other, and the control target tension Fref(m)* is set to the larger value from among the control target tension Fref(m)* in the immediately preceding routine and the tentative target tension Fref in the current routine (Fref(m)*=MAX {Fref, Fref(m−1)*}. In S113 to S119, as in the embodiment of the invention described above, the additional pulling control is executed. In this case, the tension Fc that is the detection value Fout and the control target tension Fref(m)* are compared with each other. When the number of times the additional pulling control is executed exceeds the predetermined number of times K0, an affirmative determination is made in S151, and S152 is not executed. Accordingly, the hysteresis characteristics are not taken into account.

Figure 19:
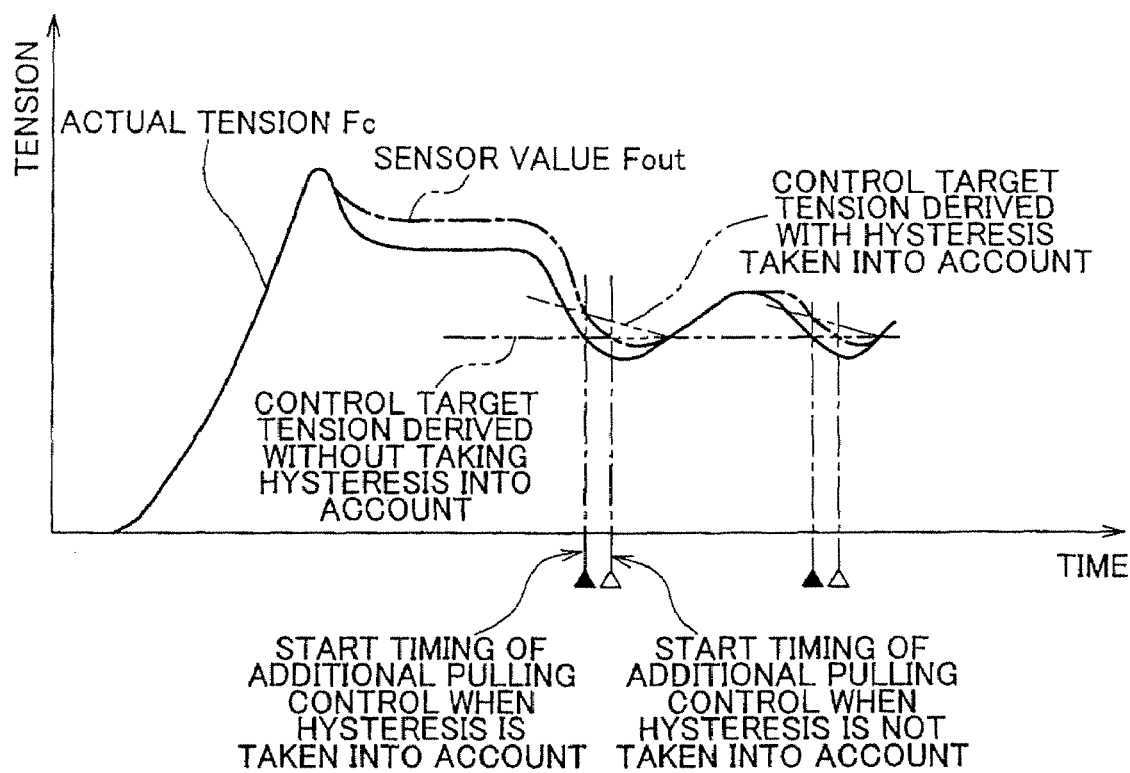
FIG. 19 is a graph showing the manner in which the tension of the cable changes when a program that differs from the electric parking brake control program is executed.

An example of such configuration is shown in FIG. 19. As shown in FIG. 19, the control target tension is set to a value larger than the control target tension, which is set without taking the hysteresis characteristics into account, by an amount corresponding to the hystresis width ΔHs. Then, the sensor value and the control target tension (the hysteresis-based moving force-based target tension) Frefb are compared with each other. As in the case shown in FIG. 18, the additional pulling control is started at an appropriate timing. According to this configuration as well, when the number of times the additional pulling control is executed has exceeded the predetermined number of times, the hysteresis width is not added to the control target tension, and the control target tension is used as it is. In this example, in the electric parking brake ECU 200, a unit that stores S150 to S153, S106 to S109, and S113 to S119, a unit that executes S150 to S153, S106 to S109, and S113 to S119, etc. constitute a hysteresis-based control unit. The hysteresis-based control unit serves as a second hysteresis-based control unit. In the second hysteresis-based control unit, a unit that stores S150, S152, S153, S106, S107, and S113 to S119, a unit that executes S150, S152, S153, S106, S107, and S113 to S119, etc. constitute a second early-stage tension control unit, and a unit that stores S150, S151, S153, S106, S107, and S113 to S119, a unit that executes S150, S151, S153, S106, S107, and S113 to S119, etc. constitute a second late-stage tension control unit.

Figure 23:
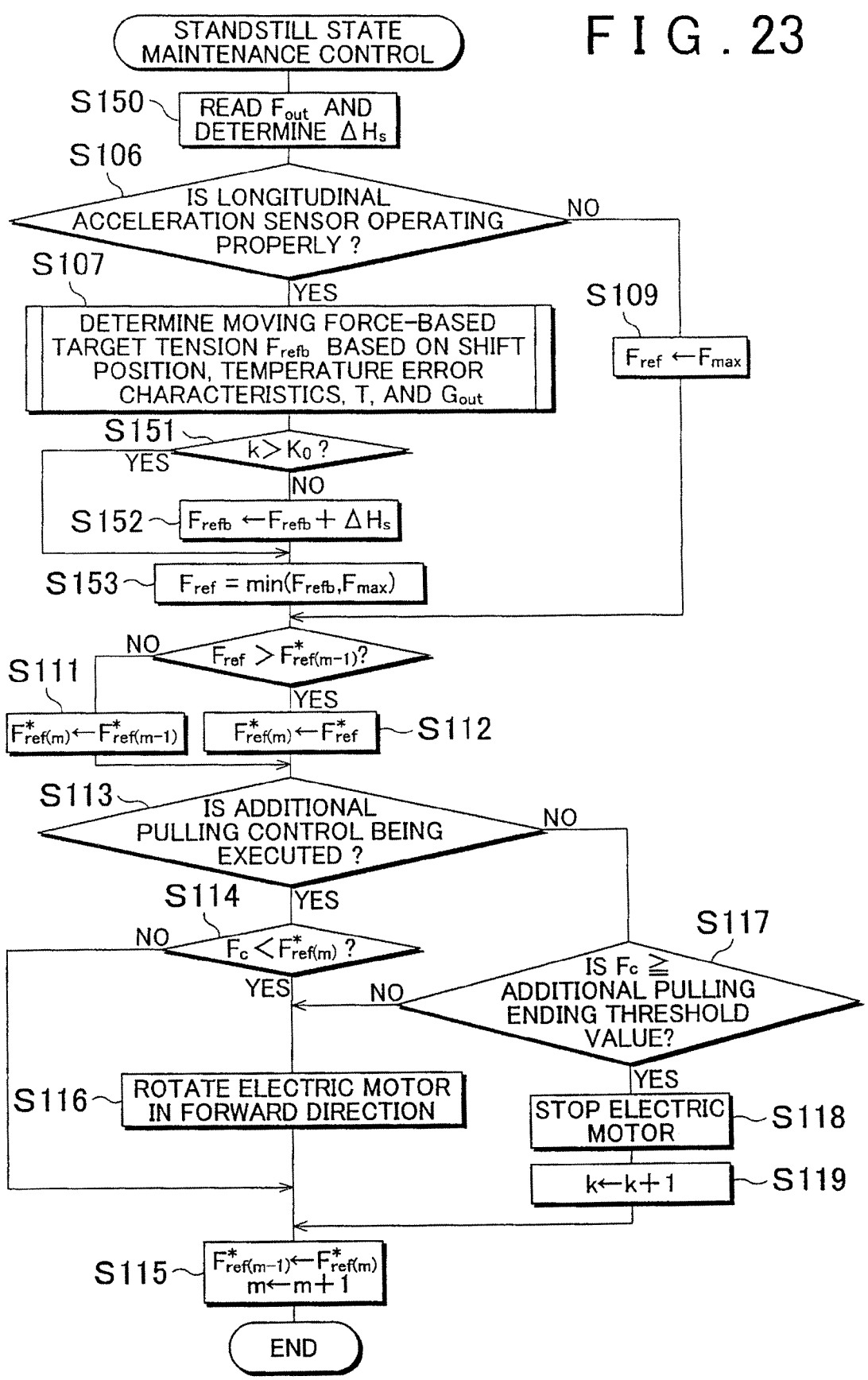
FIG. 23 is another flowchart showing a part (the standstill-state maintenance control) of the electric parking brake control program.

The tension of the cable 22 may be controlled based on not only the hystresis characteristics of the tension sensor 90 but also the hysteresis characteristics of the entire electric parking brake mechanism. In this case, the hysteresis width ΔHs is set to the hysteresis width of the entire electric parking brake mechanism 30. The hystresis width ΔHs in S102 and S103 in the flowchart in FIG. 12 or the hysteresis width ΔHs in S150 and S152 in the flowchart in FIG. 23 is used as the hysteresis width of the electric parking brake mechanism 30, which is determined based on the sensor value detected by the tension sensor 90. The tension may be controlled as in the embodiment of the invention described above. In this example, the hysteresis width of the entire electric parking brake mechanism 30 may be set based on the sensor value detected by the tension sensor 90, the friction member pushing force or the braking torque. In any of these cases, preferably, the relationship among the hysteresis width of the entire electric parking brake mechanism 30 and the sensor value detected by the tension sensor 90, or the braking torque (the friction member pushing force) is determined and stored in advance. The anchor member 106 may be provided with a force sensor (for example, a strain gauge). In this way, the braking torque (corresponding to the friction member pushing force) is detected. The hysteresis width may be a constant value independently of the sensor value detected by the tension sensor 90, the degree of the braking torque, etc.

In the embodiment of the invention described above, it is not indispensable to take the hysteresis characteristics of the tension sensor 90 and the hysteresis characteristics in the electric parking brake mechanism 30 into account. Also, the hysteresis characteristics may be taken into account during the standstill state maintenance control independently of the number of times the additional pulling control is executed. In addition, the predetermined number of times the additional pulling control is executed is not limited to twice, and may be three times or more. The tension sensor 90 may include a relative movement amount detection unit (a magnetoresistive element sensor unit) that detects a displacement based on a change in the resistance of a semiconductor. In the embodiment of the invention, the tension sensor 90 detects a displacement of the magnet 258 with respect to the hall element 260 based on a change in the electric characteristics of a semiconductor, and determines the tension by multiplying the displacement of the magnet 258 with respect to the hall element 260 by a constant of a spring. Alternatively, the tension sensor 90 may determine the tension based on a distortion. In this case, the tension may be controlled with the temperature characteristics of the tension sensor taken into account, because the detected value is sometimes influenced by the temperature of the tension sensor. In the embodiment of the invention described above, the longitudinal acceleration sensor 226 is a capacitance sensor. Alternatively, the longitudinal acceleration sensor 226 may be a strain gauge type sensor. In this case as well, the absolute value of an error needs to be taken into account. In the embodiment of the invention described above, the temperature characteristics of the longitudinal acceleration sensor 226 are expressed by the relationship between the temperature and the absolute value of an error. Alternatively, the temperature characteristics of the longitudinal acceleration sensor 226 may be expressed by the relationship between the temperature and point 0 shift amount. If the relationship between the temperature and the point 0 shift amount is determined in each longitudinal acceleration sensor, the actual longitudinal acceleration G (an example of the longitudinal acceleration with the temperature taken into account) may be determined based on the point 0 shift amount and the sensor value Gout.

In the control over the electric motor 10, when the tentative target tension Fref in the current routine becomes smaller than the control target tension Fref(n−1)* in the immediately preceding routine by an amount equal to or larger than a predetermined value, the control target tension Fref(n)* in the current routine may be reduced. In the standstill state maintenance control, the slack control may be executed, and the target value tracking control may be executed. Also, it is not indispensable to add the slack compensation amount ΔFrefc to the moving force-based target tension Frefb when the parking brakes 18 and 20 are applied. Also, it is not indispensable to set the slack compensation amount ΔFrefc based on both the shift position and the inclination angle θ of the vehicle. The slack compensation amount ΔFrefc may be set based on one of the shift position and the inclination angle θ of the vehicle, based on the moving force-based target tension Frefb, or based on the degree of the input torque. In the embodiment of the invention, the target tension when the parking brakes 18 and 20 are applied is set to the sum of the moving force-based target tension Frefb and the slack compensation amount ΔFrefc (the slack-based target tension). Alternatively, the target tension when the parking brakes 18 and 20 are applied is set to the value obtained by adding the early-stage slack compensation amount corresponding to the slack due to backlash to the slack-based target tension Frefa. In addition, it is not indispensable to vary the moving force-based target tension Frefb depending on whether the vehicle is at a standstill on an uphill slope or a downhill slope. When the absolute value of the inclination angle θ of the vehicle is the same, the moving force-based target tension Frefb may be set to the same value regardless of whether the vehicle is at a standstill on an uphill slope or a downhill slope.

In the embodiment of the invention, the tension applied to the cable is controlled so as to approach the target tension that is set based on the relationship between the braking torque and the tension of the cable and the target value of the braking torque. Alternatively, the electric current that actually passes through the electric motor 10 may be controlled so as to approach the target current value that is set based on the relationship between the electric current that passes through the electric motor 10 (corresponding to the load placed on the electric motor 10) and the braking torque, and the target value of the braking torque. Alternatively, the braking torque produced by the brake may be directly detected, and the braking torque may be controlled so as to match the target value. In a drum brake, if the force applied to the anchor member 106 is detected, the actual braking torque may be detected. Thus, because the braking torque, the tension of the cable and the electric current passing through the electric motor are correlated with each other. Accordingly, it is possible to control the braking torque to a desired value using any one of the braking torque, the tension of the cable and the electric current passing through the electric motor.

In the embodiment of the invention, the inclination angle θ of the vehicle with respect to the horizontal line is detected based on the value detected by the longitudinal acceleration sensor 226, and the moving force-based target tension Frefb is determined using the inclination angle θ of the vehicle as the inclination angle of the road (on the assumption that the vehicle is parallel to the road surface). Alternatively, the attitude of the vehicle may be determined, and the inclination angle of the road may be then detected. A vehicle height sensor, a pitch angle sensor, etc. may be provided to the vehicle, the attitude of the vehicle may be detected based on the values detected by these sensors, and the inclination angle of the road may be detected based on the inclination angle of the vehicle and the attitude of the vehicle. For example, when the vehicle is at a standstill on an uphill slope, the inclination angle of the vehicle (the value set based on the value detected by the longitudinal acceleration sensor 226) is θs, the vehicle is tilted forward, and the pitch angle is θp, the inclination angle θ of the road is (θs+θp). In addition, the parking brake may be a disc brake. The structure of the electric parking brake mechanism is not limited to that in the embodiment of the invention described above. For example, the motion conversion mechanism may have the structure in which the cables 22 and 24 are directly wound around the gear provided on the output shaft of the electric motor 10. In this case, the cables 22 and 24 extend in the direction in which the tangent line of the gear extends, and are linearly moved (pulled or slackened) in accordance with the rotation of the electric motor 10. The drum brake may be a uni-servo type. In addition, the motion conversion mechanism may include a worm and a worm wheel. In this case, a clutch need not be provided. The electric motor 10 may be an ultrasonic motor. In this case, a clutch is not necessarily provided. The invention is not limited to the embodiment described above. To the contrary, the invention is intended to cover various modifications and equivalent arrangements that are made based on the knowledge of those who are skilled in the art.

What is claimed is:

1. An electric parking brake system, comprising:
   a drum brake that includes a drum which rotates together with a wheel of a vehicle and of which an inner peripheral face is used as a friction face; a shoe which is fitted to a backing plate that is a non-rotating body so as to be movable relative to the backing plate, and which has a friction member on an outer peripheral face; and a pushing mechanism that pushes the shoe against the friction face to suppress a rotation of the drum;
an electric motor;
a motion conversion mechanism that converts a rotation of a rotating shaft of the electric motor into a linear motion of an output member of the motion conversion mechanism;
a cable that is connected at one end to the output member of the motion conversion mechanism, and that is connected at the other end to the pushing mechanism;
a maintaining mechanism that maintains a friction member pushing force that is a force with which the friction member is pushed against the friction face in the drum brake, when electric current is not supplied to the electric motor; and
a tension control unit that controls a tension of the cable by controlling the electric motor such that the friction member pushing force in the drum brake is controlled,
wherein the tension control unit includes an inclination-based target value setting unit that executes control such that the tension of the cable approaches a target value, and that sets the target value to a larger value when the vehicle is maintained at a standstill on a downhill slope than when the vehicle is maintained at a standstill on an uphill slope, even when an absolute value of an inclination angle of the uphill slope and an absolute value of an inclination angle of the downhill slope are equal to each other and a drive power is not applied to the vehicle.

* * * * *